(12) United States Patent
Nadakuduti et al.

(10) Patent No.: US 12,063,060 B2
(45) Date of Patent: *Aug. 13, 2024

(54) REDUCTIONS IN TRANSMIT POWER BASED ON SPATIAL DISTRIBUTIONS OF RADIO FREQUENCY EXPOSURE IN MULTI-TRANSMITTER SCENARIOS

(71) Applicant: QUALCOMM Incorporated, San Diego, CA (US)

(72) Inventors: Jagadish Nadakuduti, Bermuda Dunes, CA (US); Lin Lu, San Diego, CA (US); Paul Guckian, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/198,255

(22) Filed: May 16, 2023

(65) Prior Publication Data

US 2023/0291428 A1 Sep. 14, 2023

Related U.S. Application Data

(63) Continuation of application No. 17/376,067, filed on Jul. 14, 2021, now Pat. No. 11,664,841.

(60) Provisional application No. 63/052,371, filed on Jul. 15, 2020.

(51) Int. Cl.
*H04W 52/38* (2009.01)
*H04B 1/3827* (2015.01)
*H04B 17/10* (2015.01)

(52) U.S. Cl.
CPC ......... *H04B 1/3838* (2013.01); *H04B 17/104* (2015.01); *H04W 52/38* (2013.01)

(58) Field of Classification Search
CPC ...... H04B 1/3838; H04B 17/10; H04W 52/38
See application file for complete search history.

(56) References Cited

U.S. PATENT DOCUMENTS

| 10,652,833 | B2* | 5/2020 | Nadakuduti | .......... | H04W 52/38 |
| 11,664,841 | B2* | 5/2023 | Nadakuduti | ......... | H04B 17/104 |
| | | | | | 455/522 |
| 2012/0021707 | A1* | 1/2012 | Forrester | ............... | H04W 52/30 |
| | | | | | 455/115.3 |
| 2022/0021409 | A1* | 1/2022 | Nadakuduti | .......... | H04W 52/38 |

OTHER PUBLICATIONS

International Preliminary Report on Patentability—PCT/US2021/041901 The International Bureau of WIPO—Geneva, Switzerland, Jan. 26, 2023.
International Search Report and Written Opinion—PCT/US2021/041901—ISA/EPO—Oct. 22, 2021.

* cited by examiner

*Primary Examiner* — Hai V Nguyen
(74) *Attorney, Agent, or Firm* — Loza & Loza, LLP/Qualcomm Incorporated

(57) ABSTRACT

According to certain aspects a wireless device includes transmitters, and a processor coupled to the transmitters. The processor is configured to determine a radio frequency (RF) exposure value at a peak location based on transmission power levels for the transmitters, determine a contribution of each one of the transmitters to the RF exposure value at the peak location, and reduce the transmission power level for each one of one or more of the transmitters based on the contributions of the transmitters to the RF exposure value at the peak location.

30 Claims, 16 Drawing Sheets

REDUCTIONS IN TRANSMIT POWER BASED ON SPATIAL DISTRIBUTIONS OF RADIO FREQUENCY EXPOSURE IN MULTI-TRANSMITTER SCENARIOS

CROSS-REFERENCE TO RELATED APPLICATIONS

This application for patent is a continuation of U.S. patent application Ser. No. 17/376,067 filed in the U.S. Patent Office on Jul. 14, 2021, which claims priority to and the benefit of provisional patent application No. 63/052,371 filed in the United States Patent and Trademark Office on Jul. 15, 2020, and the entire content of these applications are incorporated herein by reference as if fully set forth below in its entirety and for all applicable purposes.

TECHNICAL FIELD

Aspects of the present disclosure relate generally to wireless devices, and more particularly, to reducing transmission power to meet radio frequency (RF) exposure compliance.

DESCRIPTION OF THE RELATED TECHNOLOGY

Modern wireless devices (e.g., cellular phones) are generally required to limit a user's exposure to radio frequency (RF) radiation according to RF exposure limits set by domestic and international regulators. To ensure that a wireless device complies with an RF exposure limit, techniques have been developed to enable the wireless device to assess RF exposure from the wireless device in real time and adjust the transmission power of the wireless device accordingly to comply with the RF exposure limit.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to certain aspects a wireless device includes transmitters, and a processor coupled to the transmitters. The processor is configured to determine a radio frequency (RF) exposure value at a first location based on transmission power levels for the transmitters, determine a contribution of each one of the transmitters to the RF exposure value at the first location, and reduce the transmission power level for each one of one or more of the transmitters based on the contributions of the transmitters to the RF exposure value at the first.

According to certain aspects a method implemented in a wireless device having transmitters and a processor includes determining an RF exposure value at a first location based on transmission power levels for the transmitters, determining a contribution of each one of the transmitters to the RF exposure value at the first location, and reducing the transmission power level for each one of one or more of the transmitters based on the contributions of the transmitters to the RF exposure value at the first location.

According to certain aspects an apparatus for wireless communication includes transmitters and a processor, means for determining an RF exposure value at a first location based on transmission power levels for the transmitters, means for determining a contribution of each one of the transmitters to the RF exposure value at the first location, and means for reducing the transmission power level for each one of one or more of the transmitters based on the contributions of the transmitters to the RF exposure value at the first location.

In some aspects, the RF exposure value is a specific absorption rate (SAR) value, a power density (PD) value, or a combined SAR and PD value.

In one aspect, the processor is configured to reduce the transmission power level for each one of the one or more of the transmitters by determining, for each transmitter, a proportion of the RF exposure value attributable to the each transmitter at the first location, and reducing the transmission power level for the each transmitter in accordance with the proportion of the RF exposure value that is attributable to the each transmitter, wherein the RF exposure value at the first location corresponds to a peak RF exposure value.

In one aspect, the processor is configured to reduce the transmission power level for each one of the one or more of the transmitters by determining one of the transmitters that contributes most to the RF exposure value at the first location when the RF exposure value at the first location corresponds to a peak RF exposure value, and reducing the transmission power level for the one of the transmitters by a largest amount among the transmitters.

In some aspects, the processor is configured to determine a reduction in the RF exposure value at the first location to meet an RF exposure limit, and the processor is configured to reduce the transmission power level for each one of the one or more of the transmitters based also on the determined reduction in the RF exposure value at the first location.

In some aspects, each transmitter is assigned a respective priority, and the processor is configured to reduce the transmission power level for each one of the one or more of the transmitters based also on the priorities of the transmitters.

In one aspect, the processor is configured to reduce the transmission power level for each one of the one or more of the transmitters such that two or more of the transmitters contribute approximately equally to the RF exposure value at the first location after the reduction. The processor may be configured to reduce the transmission power level for each one of the one or more of the transmitters such that all of the transmitters contribute approximately equally to the RF exposure value at the first location after the reduction.

In one aspect, after the reduction, the processor is configured to set a transmission power limit for each transmitter based on the transmission power level for the transmitter.

In one aspect, the processor is configured to determine the RF exposure value at the first location by for each transmitter, scaling a respective RF exposure distribution based the transmission power level for the transmitter, combining the scaled RF exposure distributions to obtain a combined RF exposure distribution, and determining the RF exposure value at the first location in the combined RF exposure distribution, wherein the RF exposure value at the first location corresponds to a peak RF exposure value.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
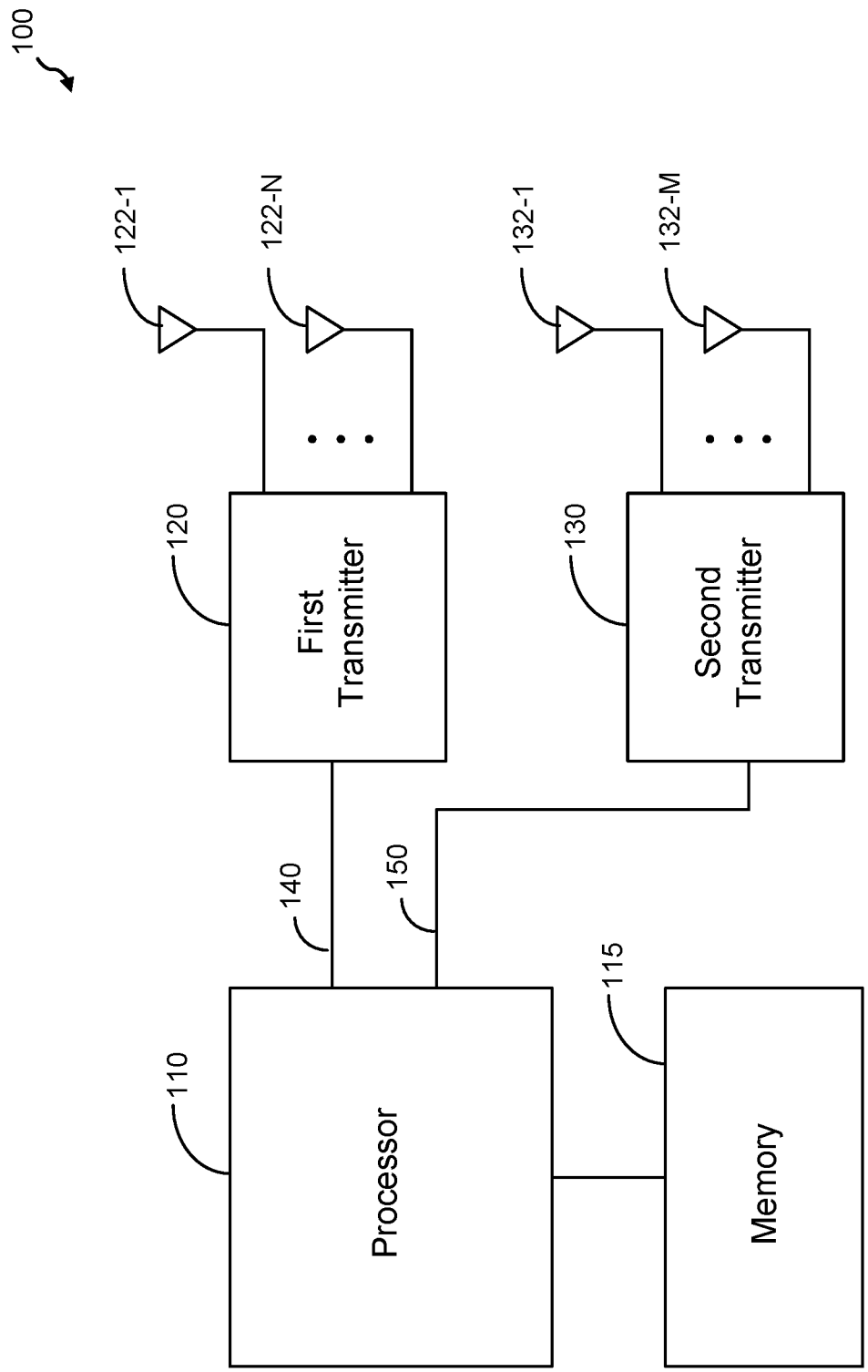
FIG. 1 shows an example of a wireless device in which aspects of the present disclosure may be implemented.

FIG. 1 shows an example of a wireless device 100 in which aspects of the present disclosure described herein may be implemented. The wireless device 100 may comprise a mobile wireless device (e.g., a cellular phone, a tablet, a laptop, etc.) a wireless access point, a customer premises equipment (CPE), or some other wireless device.

The wireless device 100 includes a processor 110, and a memory 115 coupled to the processor 110. The memory 115 may store instructions that, when executed by the processor 110, cause the processor 110 to perform one or more of the operations described herein. The processor 110 may be implemented with a general-purpose processor, a digital signal processor (DSP), a baseband modem, an application specific integrated circuit (ASIC), a field programmable gate array (FPGA) or other programmable logic device (PLD), discrete gate logic, discrete hardware components, or any combination thereof configured to perform one or more of the operations described herein. In some examples, multiple processors 110 and/or memories 115 are implemented. One or more of the operations described herein may be performed by two or more of the processors 110, for example by executing instructions stored in the memory or memories 115.

The wireless device 100 also includes a first transmitter 120, a first plurality of antennas 122-1 to 122-N (where N is a positive integer) coupled to the first transmitter 120, and a first bus 140 coupled between the first transmitter 120 and the processor 110. In certain aspects, the first transmitter 120 is configured to transmit signals via one or more of the first plurality of antennas 122-1 to 122-N using one or more wireless communication technologies, including, but not limited to, a third generation (3G) technology (e.g., CDMA), a fourth generation (4G) technology (also known as Long Term Evolution (LTE)), a fifth generation (5G) technology, one or more technologies based on one or more IEEE 802.11 protocols (e.g., IEEE 802.11ac, IEEE 802.11n, IEEE 802.11ad, IEEE 802.11ax, IEEE 802.11ay, etc.), and/or one or more other technologies. In some aspects, the first transmitter 120 may be configured to transmit signals via multiple antennas 122-1 to 122-N using multiple-input-multiple-output (MIMO) transmission to increase the capacity of a radio link between the wireless device 100 and another wireless device (not shown). In some aspects, the first transmitter 120 may be configured to transmit signals via multiple antennas 122-1 to 122-N using beamforming to direct transmissions toward another wireless device (not shown). In these aspects, the transmissions may be electrically steered by adjusting the relative phases and/or amplitudes of the transmit signals for the different antennas 122-1 to 122-N.

The processor 110 interfaces with the first transmitter 120 via the first bus 140. The first bus 140 may include one or more signal lines between the processor 110 and the first transmitter 120. To transmit data, the processor 110 may process the data into one or more signals (e.g., baseband signals or intermediate-frequency signals). The processing performed by the processor 110 may include coding the data and modulating the coded data (e.g., using any one of a variety of different modulation schemes, including BPSK, QPSK, QAM, etc.). The processor 110 may output the one or more signals to the first transmitter 120 via the first bus 140. The first transmitter 120 may then process the one or more signals from the processor 110 into one or more RF signals for transmission via one or more of the antennas 122-1 to 122-N. The processing performed by the first transmitter 120 may include frequency up-conversion, power amplification, etc.

In certain aspects, the processor 110 may adjust the transmission power for one or more of the antennas 122-1 to 122-N. For example, the first transmitter 120 may include multiple amplifiers (not shown) where each of the amplifiers is coupled to a respective one of the antennas. For each amplifier, the processor 110 may output a respective control signal to the amplifier via the first bus 140 to control the gain of the amplifier. In this example, the processor 110 may adjust the transmission power for an antenna by adjusting the gain of the respective amplifier accordingly. In another example, the processor 110 may output one or more signals to the first transmitter 120 where each of the one or more signals corresponds to a respective one of the antennas 122-1 to 122-N. In this example, the processor 110 may adjust the transmission power for an antenna by adjusting the amplitude of the respective signal accordingly. It is to be appreciated that the present disclosure is not limited to the above examples, and that the processor 110 may employ other techniques to adjust transmission power.

In certain aspects, the processor 110 may adjust transmission power for one or more of the antennas 122-1 to 122-N using an open power control loop and/or a closed power control loop. For the example of an open power control loop, the wireless device 100 may receive a pilot signal from another wireless device (not shown) via a receiver (not shown). In this example, the processor 110 estimates channel conditions between the wireless device 100 and the other wireless device based on the received pilot signal, and adjusts the transmission power for one or more of the antennas 122-1 to 122-N based on the estimated channel conditions. For the example of a closed power control loop, the wireless device 100 receives a feedback signal from the other wireless device via a receiver (not shown), in which the feedback signal indicates channel conditions between the wireless device 100 and the other wireless device. In this example, the processor 110 adjusts the transmission power for one or more of the antennas 122-1 to 122-N based on the indicated channel conditions.

The processor 110 may also adjust transmission power for one or more of the antennas 122-1 to 122-N based on data rate. For example, the processer 110 may increase (boost) the transmission power to transmit a short data burst.

Further, the processor 110 may adjust transmission power for one or more of the antennas 122-1 to 122-N to keep RF exposure from the wireless device 100 within an RF exposure limit set by a regulator (e.g., FCC), as discussed further below. In this case, the transmission power is constrained by the RF exposure limit.

The wireless device 100 also includes a second transmitter 130, a second plurality of antennas 132-1 to 132-M coupled to the second transmitter 130, and a second bus 150 coupled between the second transmitter 130 and the processor 110 in the illustrated example. In certain aspects, the second transmitter 130 is configured to transmit signals via one or more of the second plurality of antennas 132-1 to 132-M using one or more wireless communication technologies, including, but not limited to, a 3G technology, a 4G technology, a 5G technology, one or more technologies based on one or more IEEE 802.11 protocols (e.g., IEEE 802.11ac, IEEE 802.11n, IEEE 802.11ad, IEEE 802.11ax, IEEE 802.11ay, etc.), and/or one or more other technologies. The second transmitter 130 may transmit signals via multiple antennas 132-1 to 132-M using MIMO transmission, beamforming, and/or other method. In certain aspects, the first transmitter 120 and the second transmitter 130 may simultaneously transmit signals using different wireless communication technologies, as discussed further below.

The processor 110 interfaces with the second transmitter 130 via the second bus 150, which may include one or more signal lines between the processor 110 and the second transmitter 130. To transmit data, the processor 110 may process the data into one or more signals (e.g., baseband signals or intermediate-frequency signals). The processing performed by the processor 110 may include coding the data and modulating the coded data (e.g., using any one of a variety of different modulation schemes, including BPSK, QPSK, QAM, etc.). The processor 110 may output the one or more signals to the second transmitter 130 via the second bus 150. The second transmitter 130 may then process the one or more signals from the processor 110 into one or more RF signals for transmission via one or more of the antennas 132-1 to 132-M. The processing performed by the second transmitter 130 may include frequency up-conversion, power amplification, etc.

The processor 110 may adjust the transmission power for one or more of the antennas 132-1 to 132-M. For example, the second transmitter 130 may include multiple amplifiers (not shown) where each of the amplifiers is coupled to a respective one of the antennas 132-1 to 132-M. For each amplifier, the processor 110 may output a respective control signal to the amplifier via the second bus 150 to control the gain of the amplifier. In this example, the processor 110 may adjust the transmission power for an antenna by adjusting the gain of the respective amplifier accordingly. In another example, the processor 110 may output one or more signals to the second transmitter 130 where each of the one or more signals corresponds to a respective one of the antennas 132-1 to 132-M. In this example, the processor 110 may adjust the transmission power for an antenna by adjusting the amplitude of the respective signal accordingly. It is to be appreciated that the present disclosure is not limited to the above examples, and that the processor 110 may employ other techniques to adjust transmission power.

The processor 110 may adjust transmission power for one or more of the antennas 132-1 to 132-M using an open power control loop and/or a closed power control loop, as discussed above. The processor 110 may also adjust transmission power for one or more of the antennas 132-1 to 132-M to keep RF exposure from the wireless device 100 within an RF exposure limit set by a regulator, as discussed further below.

It is to be appreciated that the wireless device 100 may include one or more additional transmitters in addition to the first and second transmitters 120 and 130 shown in FIG. 1. Although the first and second transmitters 120 and 130 are coupled to separate sets of antennas in the example shown in FIG. 1, it is to be appreciated that the first and second transmitters 120 and 130 may share one or more antennas. Also, in some implementations, the first transmitter 120 may transmit on only one antenna and/or the second transmitter 130 may transmit on only one antenna. Further, multiple processors 110 may be implemented, as discussed above. In such examples, one or more of the transmitters (e.g., 120, 130) may be coupled to multiple processors. In some examples with multiple processors 110 and multiple transmitters, certain (or all) transmitters may be coupled to respective processors.

Modern wireless devices (e.g., cellular phones) are generally required to limit a user's exposure to radio frequency (RF) radiation according to exposure limits set by domestic and international regulators. RF exposure may be expressed in terms of a specific absorption rate (SAR), which measures energy absorption by human tissue per unit mass and may have units of watts per kilogram (W/kg). RF exposure may also be expressed in terms of power density (PD), which measures energy absorption per unit area and may have units of mW/cm$^2$.

SAR may be used to assess RF exposure for transmission frequencies less than 10 GHz, which cover wireless communication technologies such as 3G (e.g., CDMA), 4G, IEEE 802.11ac, etc. PD may be used to assess RF exposure for transmission frequencies higher than 10 GHz, which cover wireless communication technologies such as IEEE 802.11ad, 5G, etc. Thus, different metrics may be used to assess RF exposure for different wireless communication technologies.

The wireless device 100 may simultaneously transmit signals using multiple wireless communication technologies. For example, the wireless device 100 may simultaneously transmit signals using a first wireless communication technology operating below 10 GHz (e.g., 3G, 4G, etc.) and a second wireless communication technology operating above 10 GHz (e.g., 5G, IEEE 802.11ad), or first and second wireless communication technologies in similar or overlapping bands (e.g., WWAN and WLAN). Since the wireless device 100 simultaneously transmits signals using the first and second technologies, the user of the device is exposed to RF radiation from transmissions using both technologies. Accordingly, techniques are needed for determining RF exposure compliance for cases where the wireless device 100 simultaneously transmits signals using multiple wireless communication technologies.

Aspects of the present disclosure enable the wireless device 100 to assess RF exposure (in real time) for cases where the wireless device 100 simultaneously transmits signals using multiple wireless communication technologies, as discussed further below.

In certain aspects, the wireless device 100 may simultaneously transmit signals using the first wireless communication technology (e.g., 3G, 4G, IEEE 802.11ac, etc.) in which RF exposure is measured in terms of SAR, and the second wireless communication technology (e.g., 5G, IEEE 802.11ad, etc.) in which RF exposure is measured in terms of PD. In these aspects, the first transmitter 120 may transmit first signals according to the first wireless communication technology, and the second transmitter 130 may transmit second signals according to the second wireless communication technology. When the wireless device 100 simultaneously transmits the first and second signals using the first and second technologies, respectively, the processor 110 may assess the combined RF exposure from the first and second technologies to ensure compliance with RF exposure limits, as discussed further below. In other aspects, the first and second wireless communication technologies are both associated with SAR measurements, or are both associated with PD measurements. In yet other aspects, techniques as described herein may be used to combine communications from different transmitters and/or antennas that communicate with the same wireless communication technology. While certain descriptions below refer to a first wireless technology, a second wireless technology, SAR, and/or PD, it will be understood that these descriptions may apply equally to the transmissions described in this paragraph.

To assess RF exposure from transmissions using the first technology (e.g., 3G, 4G, IEEE 802.11ac, etc.), the wireless device 100 may include multiple SAR distributions for the first technology stored in the memory 115. Each of the SAR distributions may correspond to a respective one of multiple transmit scenarios supported by the wireless device 100 for the first technology. The transmit scenarios may correspond to various combinations of antennas 122-1 to 122-N, frequency bands, channels and/or body positions, as discussed further below.

The SAR distribution (also referred to as a SAR map) for each transmit scenario may be generated based on measurements (e.g., E-field measurements) performed in a test laboratory using a model of a human body. After the SAR distributions are generated, the SAR distributions are stored in the memory 115 to enable the processor 110 to assess RF exposure (e.g., in real time), as discussed further below. Each SAR distribution includes a set of SAR values, where each SAR value may correspond to a different location (e.g., on the model of the human body). Each SAR value may comprise a SAR value averaged over a mass of 1 g or 10 g at the respective location.

The SAR values in each SAR distribution correspond to a particular transmission power level (e.g., the transmission power level at which the SAR values were measured in the test laboratory). Since SAR scales with transmission power level, the processor 110 may scale a SAR distribution for any transmission power level by multiplying each SAR value in the SAR distribution by the following transmission power scaler:

$$\frac{Tx_c}{Tx_{SAR}} \qquad (1)$$

where $Tx_c$ is a current transmission power level for the respective transmit scenario, and $Tx_{SAR}$ is the transmission power level corresponding to the SAR values in the stored SAR distribution (e.g., the transmission power level at which the SAR values were measured in the test laboratory).

As discussed above, the wireless device 100 may support multiple transmit scenarios for the first technology. In certain aspects, the transmit scenarios may be specified by a set of parameters. The set of parameters may include one or more of the following: an antenna parameter indicating one or more antennas used for transmission (i.e., active antennas), a frequency band parameter indicating one or more frequency bands used for transmission (i.e., active frequency bands), a channel parameter indicating one or more channels used for transmission (i.e., active channels), a body position parameter indicating the location of the wireless device 100 relative to the user's body location (head, trunk, away from the body, etc.), and/or other parameters. In cases where the wireless device 100 supports a large number of transmit scenarios, it may be very time-consuming and expensive to perform measurements for each transmit scenario in a test setting (e.g., test laboratory). To reduce test time, measurements may be performed for a subset of the transmit scenarios to generate SAR distributions for the subset of transmit scenarios. In this example, the SAR distribution for each of the remaining transmit scenarios may be generated by combining two or more of the SAR distributions for the subset of transmit scenarios, as discussed further below.

For example, SAR measurements may be performed for each one of the antennas 122-1 to 122-N to generate a SAR distribution for each one of the antennas 122-1 to 122-N. In this example, a SAR distribution for a transmit scenario in which two or more of the antennas 122-1 to 122-N are active may be generated by combining the SAR distributions for the two or more active antennas.

In another example, SAR measurements may be performed for each one of multiple frequency bands to generate a SAR distribution for each one of the multiple frequency bands. In this example, a SAR distribution for a transmit scenario in which two or more frequency bands are active may be generated by combining the SAR distributions for the two or more active frequency bands.

In certain aspects, a SAR distribution may be normalized with respect to an SAR limit by dividing each SAR value in the SAR distribution by the SAR limit. In this case, a normalized SAR value exceeds the SAR limit when the normalized SAR value is greater than one, and is below the SAR limit when the normalized SAR value is less than one. In these aspects, each of the SAR distributions stored in the memory 115 may be normalized with respect to a SAR limit.

In certain aspects, the normalized SAR distribution for a transmit scenario may be generated by combining two or more normalized SAR distributions. For example, a normalized SAR distribution for a transmit scenario in which two or more antennas are active may be generated by combining the normalized SAR distributions for the two or more active antennas. For the case in which different transmission power levels are used for the active antennas, the normalized SAR distribution for each active antenna may be scaled by the respective transmission power level before combining the normalized SAR distributions for the active antennas. The normalized SAR distribution for simultaneous transmission from multiple active antennas may be given by the following:

$$SAR_{norm\_combined} = \sum_{i=1}^{i=K} \frac{Tx_i}{Tx_{SARi}} \cdot \frac{SAR_i}{SAR_{lim}} \quad (2)$$

where $SAR_{lim}$ is a SAR limit, $SAR_{norm\_combined}$ is the combined normalized SAR distribution for simultaneous transmission from the active antennas, i is an index for the active antennas, $SAR_i$ is the SAR distribution for the $i^{th}$ active antenna, $Tx_i$ is the transmission power level for the $i^{th}$ active antenna, $Tx_{SARi}$ is the transmission power level for the SAR distribution for the $i^{th}$ active antenna, and K is the number of the active antennas. Equation (2) may be rewritten as follows:

$$SAR_{norm\_combined} = \sum_{i=1}^{i=K} \frac{Tx_i}{Tx_{SARi}} \cdot SAR_{norm\_i} \quad (3a)$$

where $SAR_{norm\_i}$ is the normalized SAR distribution for the $i^{th}$ active antenna. In the case of simultaneous transmissions using multiple active antennas at the same transmitting frequency (e.g., multiple in multiple out (MIMO)), the combined normalized SAR distribution is obtained by summing the square root of the individual normalized SAR distributions and computing the square of the sum, as given by the following:

$$SAR_{norm\_combined\_MIMO} = \left[\sum_{i=1}^{i=K} \sqrt{\frac{Tx_i}{Tx_{SARi}} \cdot SAR_{norm\_i}}\right]^2. \quad (3b)$$

In another example, normalized SAR distributions for different frequency bands may be stored in the memory 115. In this example, a normalized SAR distribution for a transmit scenario in which two or more frequency bands are active may be generated by combining the normalized SAR distributions for the two or more active frequency bands. For the case where the transmission power levels are different for the active frequency bands, the normalized SAR distribution for each of the active frequency bands may be scaled by the respective transmission power level before combining the normalized SAR distributions for the active frequency bands. In this example, the combined SAR distribution may also be computed using equation (3a) in which i is an index for the active frequency bands, $SAR_{norm\_i}$ is the normalized SAR distribution for the $i^{th}$ active frequency band, $Tx_i$ is the transmission power level for the $i^{th}$ active frequency band, and $Tx_{SARi}$ is the transmission power level for the normalized SAR distribution for the $i^{th}$ active frequency band.

To assess RF exposure from transmissions using the second technology (e.g., 5G, IEEE 802.11ad, etc.), the wireless device 100 may include multiple PD distributions for the second technology stored in the memory 115. Each of the PD distributions may correspond to a respective one of multiple transmit scenarios supported by the wireless device 100 for the second technology. The transmit scenarios may correspond to various combinations of antennas 132-1 to 132-M, frequency bands, channels and/or body positions, as discussed further below.

The PD distribution (also referred to as PD map) for each transmit scenario may be generated based on measurements (e.g., E-field measurements) performed in a test laboratory using a model of a human body. After the PD distributions are generated, the PD distributions are stored in the memory 115 to enable the processor 110 to assess RF exposure (e.g., in real time), as discussed further below. Each PD distribution includes a set of PD values, where each PD value may correspond to a different location (e.g., on the model of the human body).

The PD values in each PD distribution correspond to a particular transmission power level (e.g., the transmission power level at which the PD values were measured in the test laboratory). Since PD scales with transmission power level, the processor 110 may scale a PD distribution for any transmission power level by multiplying each PD value in the PD distribution by the following transmission power scaler:

$$\frac{Tx_c}{Tx_{PD}} \quad (4)$$

where $Tx_c$ is a current transmission power level for the respective transmit scenario, and $Tx_{PD}$ is the transmission power level corresponding to the PD values in the PD distribution (e.g., the transmission power level at which the PD values were measured in the test laboratory).

As discussed above, the wireless device 100 may support multiple transmit scenarios for the second technology. In certain aspects, the transmit scenarios may be specified by a set of parameters. The set of parameters may include one or more of the following: an antenna parameter indicating one or more antennas used for transmission (i.e., active antennas), a frequency band parameter indicating one or more frequency bands used for transmission (i.e., active frequency bands), a channel parameter indicating one or more channels used for transmission (i.e., active channels), a body position parameter indicating the location of the wireless device 100 relative to the user's body location (head, trunk, away from the body, etc.), and/or other parameters. In cases where the wireless device 100 supports a large number of transmit scenarios, it may be very time-consuming and expensive to perform measurements for each transmit scenario in a test setting (e.g., test laboratory). To reduce test time, measurements may be performed for a subset of the transmit scenarios to generate PD distributions for the subset of transmit scenarios. In this example, the PD distribution for each of the remaining transmit scenarios may be generated by combining two or more of the PD distributions for the subset of transmit scenarios, as discussed further below.

For example, PD measurements may be performed for each one of the antennas 132-1 to 132-M to generate a PD distribution for each one of the antennas 132-1 to 132-M. In this example, a PD distribution for a transmit scenario in which two or more of the antennas 132-1 to 132-M are active may be generated by combining the PD distributions for the two or more active antennas.

In another example, PD measurements may be performed for each one of multiple frequency bands to generate a PD distribution for each one of the multiple frequency bands. In this example, a PD distribution for a transmit scenario in which two or more frequency bands are active may be generated by combining the PD distributions for the two or more active frequency bands.

In certain aspects, a PD distribution may be normalized with respect to a PD limit by dividing each PD value in the PD distribution by the PD limit. In this case, a normalized PD value exceeds the PD limit when the normalized PD value is greater than one, and is below the PD limit when the normalized PD value is less than one. In some examples, each of the PD distributions stored in the memory 115 may be normalized with respect to a PD limit.

In certain aspects, the normalized PD distribution for a transmit scenario may be generated by combing two or more normalized PD distributions. For example, a normalized PD distribution for a transmit scenario in which two or more antennas are active may be generated by combining the normalized PD distributions for the two or more active antennas. For the case in which different transmission power levels are used for the active antennas, the normalized PD distribution for each active antenna may be scaled by the respective transmission power level before combining the normalized PD distributions for the active antennas. The normalized PD distribution for simultaneous transmission from multiple active antennas may be given by the following:

$$PD_{norm\_combined} = \sum_{i=1}^{i=L} \frac{Tx_i}{Tx_{PDi}} \cdot \frac{PD_i}{PD_{lim}} \quad (5)$$

where $PD_{lim}$ is a PD limit, $PD_{norm\_combined}$ is the combined normalized PD distribution for simultaneous transmission from the active antennas, i is an index for the active antennas, $PD_i$ is the PD distribution for the $i^{th}$ active antenna, $Tx_i$ is the transmission power level for the $i^{th}$ active antenna, $Tx_{PDi}$ is the transmission power level for the PD distribution for the $i^{th}$ active antenna, and L is the number of the active antennas. Equation (5) may be rewritten as follows:

$$PD_{norm\_combined} = \sum_{i=1}^{i=L} \frac{Tx_i}{Tx_{PDi}} \cdot PD_{norm\_i} \quad (6a)$$

where $PD_{norm\_i}$ is the normalized PD distribution for the $i^{th}$ active antenna. In the case of simultaneous transmissions using multiple active antennas at the same transmitting frequency (e.g., MIMO), the combined normalized PD distribution is obtained by summing the square root of the individual normalized PD distributions and computing the square of the sum, as given by the following:

$$PD_{norm\_combined\_MIMO} = \left[ \sum_{i=1}^{i=K} \sqrt{\frac{Tx_i}{Tx_{PDi}} \cdot PD_{norm\_i}} \right]^2. \quad (6b)$$

In another example, normalized PD distributions for different frequency bands may be stored in the memory 115. In this example, a normalized PD distribution for a transmit scenario in which two or more frequency bands are active may be generated by combining the normalized PD distributions for the two or more active frequency bands. For the case where the transmission power levels are different for the active frequency bands, the normalized PD distribution for each of the active frequency bands may be scaled by the respective transmission power level before combining the normalized PD distributions for the active frequency bands. In this example, the combined PD distribution may also be computed using equation (6a) in which i is an index for the active frequency bands, $PD_{norm\_i}$ is the normalized PD distribution for the $i^{th}$ active frequency band, $Tx_i$ is the transmission power level for the $i^{th}$ active frequency band, and $Tx_{PDi}$ is the transmission power level for the normalized PD distribution for the $i^{th}$ active frequency band.

As discussed above, the wireless device 100 may simultaneously transmit signals using the first technology (e.g., 3G, 4G, IEEE 802.11ac, etc.) and the second technology (e.g., 5G, IEEE 802.11ad, etc.), in which RF exposure is measured using different metrics for the first technology and the second technology (e.g., SAR for the first technology and PD for the second technology). In this case, the processor 110 may determine a first maximum allowable power level for the first technology and a second maximum allowable power level for the second technology for transmissions in a future time slot that comply with RF exposure limits. During the future time slot, the transmission power levels for the first and second technologies are constrained (i.e., bounded) by the determined first and second maximum allowable power levels, respectively, to ensure compliance with RF exposure limits, as further below. In the present disclosure, the term "maximum allowable power level" refers to a "maximum allowable power level" imposed by an RF exposure limit unless stated otherwise. It is to be appreciated that the "maximum allowable power level" is not necessarily equal to the absolute maximum power level that complies with an RF exposure limit and may be less than the absolute maximum power level that complies with the RF exposure limit (e.g., to provide a safety margin). The "maximum allowable power level" may be used to set a power level limit on a transmission at a transmitter such that the power level of the transmission is not allowed to exceed the "maximum allowable power level" to ensure RF exposure compliance.

The processor 110 may determine the first and second maximum allowable power levels as follows. The processor may determine a normalized SAR distribution for the first technology at a first transmission power level, determine a normalized PD distribution for the second technology at a second transmission power level, and combine the normalized SAR distribution and the normalized PD distribution to generate a combined normalized RF exposure distribution (referred to simply as a combined normalized distribution below). The value at each location in the combined normalized distribution may be determined by combining the normalized SAR value at the location with the normalized PD value at the location or another technique.

The processor 110 may then determine whether the first and second transmission power levels comply with RF exposure limits by comparing the peak value in the combined normalized distribution with one. If the peak value is equal to or less than one (i.e., satisfies the condition≤1), then the processor 110 may determine that the first and second transmission power levels comply with RF exposure limits (e.g., SAR limit and PD limit) and use the first and second transmission power levels as the first and second maximum allowable power levels, respectively, during the future time slot. If the peak value is greater than one, then the processor 110 may determine that the first and second transmission power levels do not comply with RF exposure limits. To avoid non-compliance during the future time slot, the processor 110 may reduce one or more of the first and second transmission power levels so that the peak value in the combined normalized distribution is equal to or less than one. In this case, the processor 110 may use the first and second transmission power levels that comply with the RF exposure limits as the first and second maximum allowable power levels, respectively, during the future time slot. The condition for RF exposure compliance for simultaneous transmissions using the first and second technologies may be given by:

$$SAR_{norm} + PD_{norm} \leq 1 \qquad (7).$$

During the future time slot, the processor 110 limits (constrains) the transmission power level of the first transmitter 120 by the first maximum allowable power level. For example, if a power control loop is used for the first technology, the power control loop is allowed to set the transmission power level of the first transmitter 120 to a power level equal to or below the first maximum allowable power level, but not a power level exceeding the first maximum allowable power level. During the future time slot, the processor 110 also limits (constrains) the transmission power level of the second transmitter 130 by the second maximum allowable power level. For example, if a power control loop is used for the second technology, the power control loop is allowed to set the transmission power level of the second transmitter 130 to a power level equal to or below the second maximum allowable power level, but not a power level exceeding the second maximum allowable power level.

Figure 2:
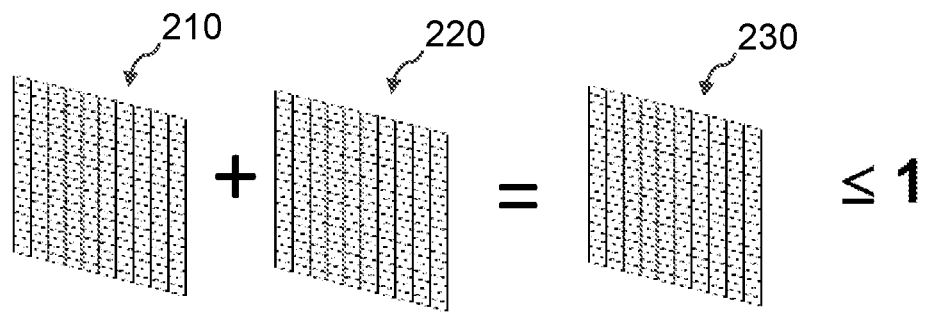
FIG. 2 shows an example of a normalized specific absorption rate (SAR) distribution combined with a normalized power density (PD) distribution according to certain aspects of the present disclosure.

FIG. 2 shows a visually representation of the normalized SAR distribution 210 and the normalized PD distribution 220, in which the normalized SAR distribution 210 and the normalized PD distribution 220 are combined to generate a combined normalized distribution 230. FIG. 2 also shows the condition that the peak value in the combined normalized distribution 230 be equal to or less than one for RF exposure compliance. Although each of the distributions 210, 220 and 230 is depicted as a two-dimensional distribution in FIG. 2, it is to be appreciated that the present disclosure is not limited to this example.

The normalized SAR distribution in equation (7) may be generated by combining two or more normalized SAR distributions as discussed above (e.g., for a transmit scenario using multiple active antennas). Similarly, the normalized PD distribution in equation (7) may be generated by combining two or more normalized PD distributions as discussed above (e.g., for a transmit scenario using multiple active antennas). In this case, the condition for RF exposure compliance in equation (7) may be rewritten using equations (3a) and (6a) as follows:

$$\sum_{i=1}^{i=K} \frac{Tx_i}{Tx_{SARi}} \cdot SAR_{norm\_i} + \sum_{i=1}^{i=L} \frac{Tx_i}{Tx_{PDi}} \cdot PD_{norm\_i} \leq 1. \qquad (8)$$

For the MIMO case, equations (3b) and (6b) may be combined instead. As shown in equation (8), the combined normalized distribution may be a function of transmission power levels for the first technology and transmission power levels for the second technology. All the points in the combined normalized distribution should meet the normalized limit of one in equation (8). Additionally, when combining SAR and PD distributions, the SAR and PD distributions should be aligned spatially or aligned with their peak locations so that the combined distribution given by equation (8) represents combined RF exposure for a given position of a human body.

For the case in which the wireless device 100 simultaneously transmits signals using the first and second technologies, the processor 110 may determine one or more maximum allowable power levels for the first technology and one or more maximum allowable power levels for the second technology for transmissions in a future time slot as follows. The processor 110 retrieves one or more normalized SAR distributions for the first technology from the memory 115 based on a transmit scenario for the first technology in the future time slot and retrieves one or more normalized PD distributions for the second technology from the memory 115 based on a transmit scenario for the second technology in the future time slot. For example, if the transmit scenario for the first technology uses multiple active antennas, then the processor 110 may retrieve a normalized SAR distribution for each of the active antennas. Similarly, if the transmit scenario for the second technology uses multiple active antennas, then the processor 110 may retrieve a normalized PD distribution for each of the active antennas.

Figure 3:
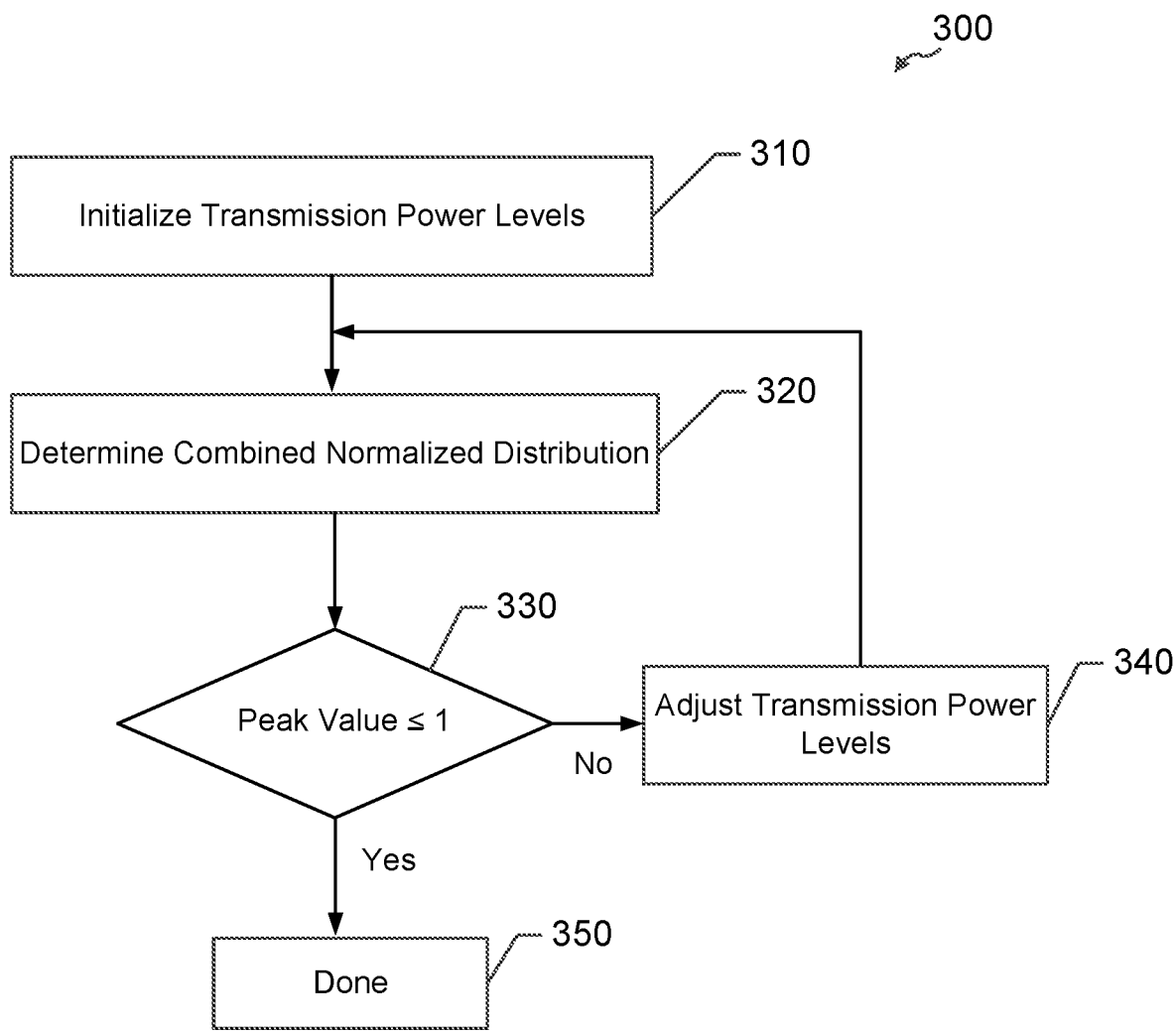
FIG. 3 is a flowchart illustrating an exemplary method for determining transmission power levels that comply with RF exposure limits for simultaneous transmissions using multiple wireless communication technologies according to certain aspects of the present disclosure.

The processor 110 may then determine maximum allowable power levels for the first and second technologies that comply with the RF exposure limits (e.g., SAR limit and PD limit) by performing the exemplary method 300 illustrated in FIG. 3.

At block 310, the processor 110 initializes the transmission power levels for the first and second technologies according to the transmit scenarios for the first and second technologies in the future time slot. If the transmit scenario for the first technology uses multiple active antennas, then the transmission power levels may include a transmission power level for each of the active antennas for the first technology. Similarly, if the transmit scenario for the second technology uses multiple active antennas, then the transmission power levels may include a transmission power level for each of the active antennas for the second technology.

The transmission power levels for the first and second technologies may be initialized according to one or more power control loops, one or more desired data rates, one or more desired beam directions or sectors, etc. In one example, the transmission power levels may be initialized to a set of default transmission power levels.

At block 320, the processor 110 determines a combined normalized distribution based on the transmission power levels in block 310, the retrieved normalized SAR distributions, and the retrieved normalized PD distributions (e.g., according to equation (8) discussed above).

At block 330, the processor 110 compares the peak value in the combined normalized distribution with one. If the peak value in the combined normalized distribution is equal to or less than one (i.e., satisfies the condition≤1), then the processor 110 determines that the transmission power levels comply with RF exposure limits. In this case, the method 300 ends at block 350, and the processor 110 uses the transmission power levels as the maximum allowable power levels for the future time slot.

If the peak value in the combined normalized distribution is greater than one, then the processor 110 adjusts the transmission power levels at block 340. For example, the processor 110 may adjust the transmission power levels by reducing one or more of the transmission power levels.

The processor 110 then repeats block 320 and 330 using the adjusted transmission power levels (i.e., determines the combined normalized distribution in block 320 using the adjusted transmission power levels). The processor 110 may repeat block 340, 320 and 330 until the peak value in the combined normalized distribution is equal or less than one, at which point the transmission power levels comply with RF exposure limits. The transmission power levels that comply with the RF exposure limits are then used as the maximum allowable power levels for the future time slot. The maximum allowable power levels include one or more maximum allowable power levels for the first technology and one or more maximum allowable power levels for the second technology. For the example in which multiple active antennas (e.g., two or more of antennas 122-1 to 122-N) are used for the first technology, the maximum allowable power levels include a maximum allowable power level for each of the active antennas. For the example in which multiple active antennas (e.g., two or more of antennas 132-1 to 132-M) are used for the second technology, the maximum allowable power levels include a maximum allowable power level for each of the active antennas.

After the processor 110 determines the maximum allowable power levels, the processor 110 constrains transmission power of the first transmitter 120 during the future time slot by the one or more determined maximum allowable power levels for the first technology. For the example in which the first transmitter 120 transmits signals using multiple antennas (e.g., two or more of antennas 122-1 to 122-N) during the future time slot, the maximum allowable power levels include a maximum allowable power level for each of the active antennas. In this example, the processor 110 constrains the transmission power level for each of the active antennas by the respective maximum allowable power level. The processor 110 also constrains transmission power of the second transmitter 130 during the future time slot by the one or more determined maximum allowable power levels for the second technology. For the example in which the second transmitter 130 transmits signals using multiple antennas (e.g., two or more of antennas 132-1 to 132-M) during the future time slot, the maximum allowable power levels include a maximum allowable power level for each of the active antennas. In this example, the processor 110 constrains the transmission power level for each of the active antennas by the respective maximum allowable power level.

It is to be appreciated that the present disclosure is not limited to the exemplary method 300 illustrated in FIG. 3, and that other methods may be employed to determine maximum allowable power levels for the first and second technologies that comply with the RF exposure limits. For example, the processor 110 may determine maximum allowable power levels that result in the peak value in the combined normalized distribution being equal to or less than a value that is less than one for a conservative approximate analysis to determine the maximum allowable power levels with fewer computations. Thus, a value of less than one may be used as the condition for assessing RF exposure compliance.

In some cases, the wireless device 100 may transmit signals using the second technology (e.g., 5G, IEEE 802.11ad, etc.) when the first technology is not active. In these cases, RF exposure from the first technology does not need to be considered to assess RF exposure compliance.

In these cases, the processor 110 may determine maximum allowable power levels for the second technology in a future time slot that comply with a PD limit as follows. First, the processor 110 may retrieve normalized PD distributions for the second technology from the memory 115 based on a transmit scenario for the second technology in the future time slot. For example, if the transmit scenario for the second technology in the future time slot uses multiple active antennas, then the processor 110 may retrieve a normalized PD distribution for each of the active antennas. In this example, the active antennas may be selected, e.g., based on a desired beam direction or sector for transmission by the wireless device 100 in the future time slot.

Figure 4:
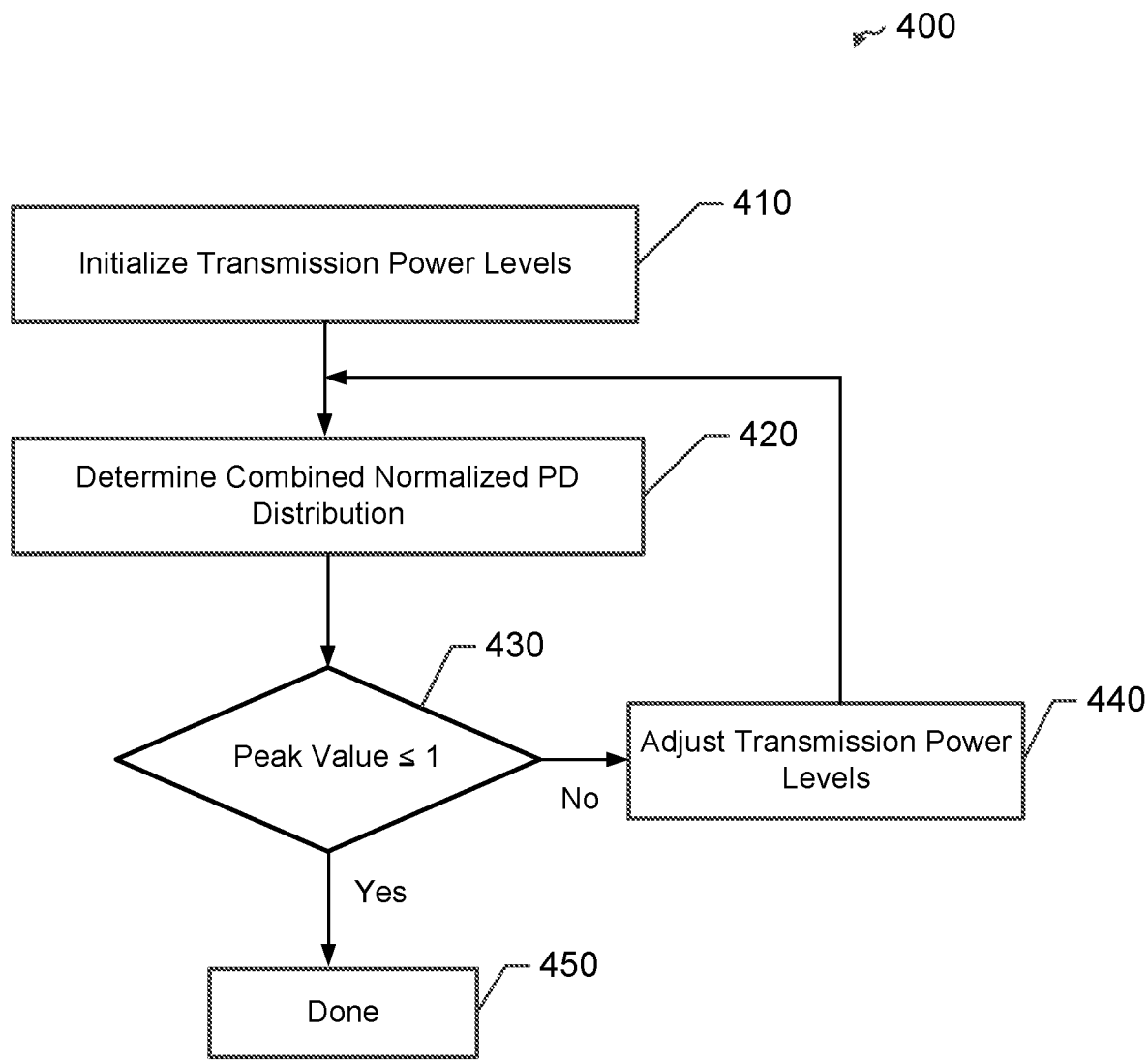
FIG. 4 is a flowchart illustrating an exemplary method for determining transmission power levels that comply with a PD limit according to certain aspects of the present disclosure.

The processor 110 may then determine maximum allowable power levels for the second technology that comply with the PD limit by performing the exemplary method illustrated in FIG. 4.

At block 410, the processor 110 initializes the transmission power levels for the second technology according to the transmit scenario for the second technology. If the transmit scenario for the second technology uses multiple active antennas, then the transmission power levels may include a transmission power level for each of the active antennas. The transmission power levels may be initialized according to a power control loop, a desired data rate, a desired beam direction or sector, etc. In one example, the transmission power levels may be initialized to a set of default transmission power levels.

At block 420, the processor 110 determines a combined normalized PD distribution based on the transmission power levels in block 410, and the retrieved normalized PD distributions (e.g., according to equation (6a) or (6b) discussed above).

At block 430, the processor 110 compares the peak value in the combined normalized PD distribution with one. If the peak value in the combined normalized PD distribution is equal to or less than one (i.e., satisfies the condition≤1), then the processor 110 determines that the transmission power levels comply with the PD limit. In this case, the method 400 ends at block 450, and the processor 110 uses the transmission power levels as the maximum allowable power levels for the second transmitter 130.

If the peak value in the combined normalized PD distribution is greater than one, then the processor 110 adjusts the transmission power levels at block 440. For example, the processor 110 may adjust the transmission power levels by reducing one or more of the transmission power levels initialized in block 410.

The processor 110 then repeats block 420 and 430 using the adjusted transmission power levels (i.e., determines the combined normalized PD distribution in block 420 using the adjusted transmission power levels). The processor 110 may repeat blocks 440, 420 and 430 until the peak value in the combined normalized PD distribution is equal or less than one, at which point the transmission power levels comply with the PD limit. The processor 110 then uses the transmission power levels that comply with the PD limit as the maximum allowable power levels for the second transmitter 130. After the processor 110 determines the maximum allowable power levels complying with the PD limit, the processor 110 constrains transmission power for the second transmitter 130 during the future time slot according to the determined maximum allowable power levels. For the example in which the second transmitter 130 transmits signals using multiple active antennas (e.g., two or more of antennas 132-1 to 132-M) during the future time slot, the maximum allowable power levels for the second technology include a maximum allowable power level for each of the active antennas. In this example, the processor 110 constrains the transmission power level for each of the active antennas by the respective maximum allowable power level.

It is to be appreciated that the present disclosure is not limited to the exemplary method 400 illustrated in FIG. 4, and that other methods may be employed to determine maximum allowable power levels that comply with the PD limit. For example, the processor 110 may determine maximum allowable power levels that that result in the peak value being equal to or less than a value that is less than one for a conservative approximate analysis to determine the maximum allowable power levels with fewer computations.

In certain cases, an RF exposure regulation requires that a time-averaged RF exposure over a time window not exceed an RF exposure limit. This allows the wireless device 100 to briefly exceed the RF exposure limit as long as the time-averaged RF exposure does not exceed the limit.

In this regard, the processor 110 may determine RF exposure compliance for the case in which the first technology is active and the second technology is not active as follows. The processor 110 may compute a time-averaged normalized SAR distribution over a first time window (e.g., 6 minutes), and compare the peak value in the time-averaged normalized SAR distribution with one to assess RF exposure compliance. If the peak value is equal to or less than one (i.e., satisfies the condition≤1), then the processor 110 may determine RF exposure compliance.

Figure 5:
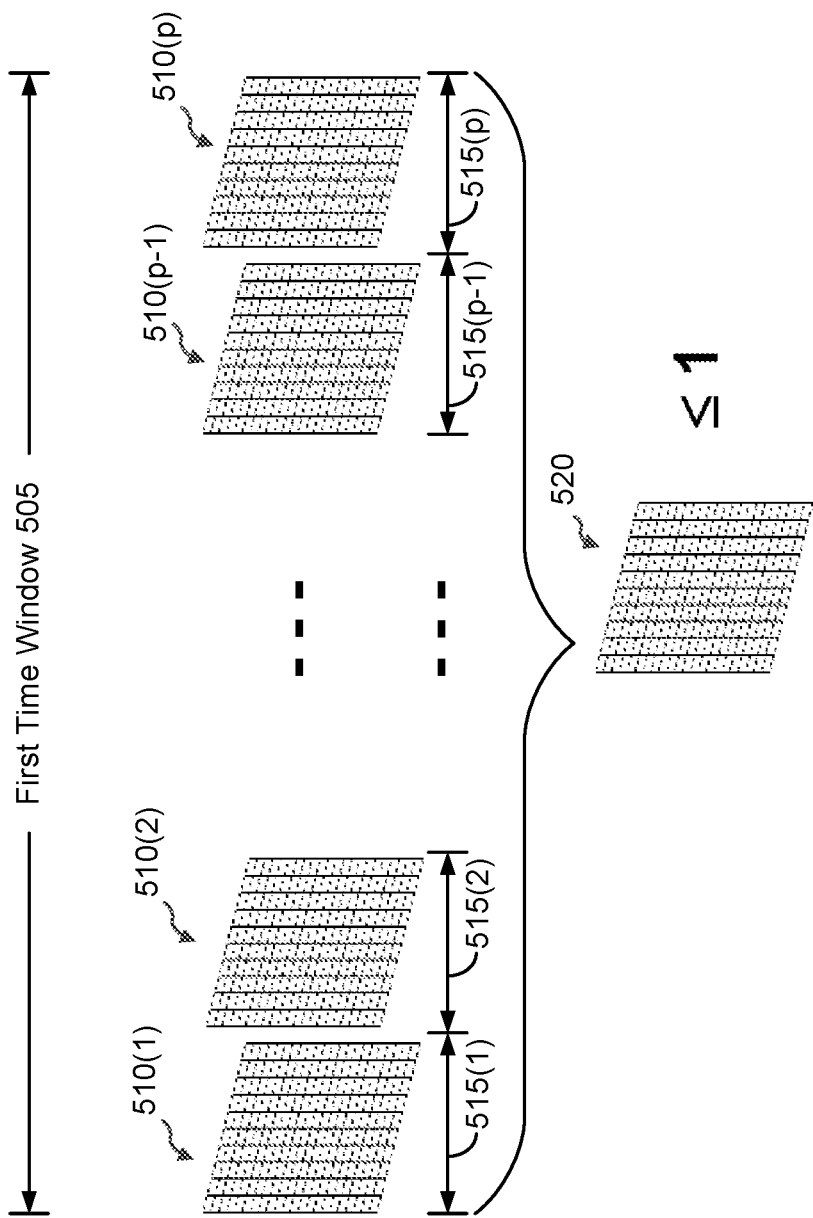
FIG. 5 shows an example of a time-averaged SAR distribution according to certain aspects of the present disclosure.

In this regard, FIG. 5 illustrates an example in which the processor 110 computes a time-averaged normalized SAR distribution over a first time window 505 (e.g., 6 minutes). In this example, the first time window 505 is divided into multiple time slots (i.e., time intervals). For instance, a 6-minute time window may be divided into 5-second time slots. In the example shown in FIG. 5, there are p number of time slots 515(1)-515(p), and p number of normalized SAR distributions 510(1)-510(p). Although each of the distributions 510(1)-510(p) is depicted as a two-dimensional distribution in FIG. 5, it is to be appreciated that the present disclosure is not limited to this example.

The processor 110 may determine a normalized SAR distribution for each time slot (e.g., according to equation (3a) or (3b)). The normalized SAR distribution for a time slot may be generated by combining two or more SAR distributions. For example, if two or more antennas are active during the time slot, then the processor 110 may combine the normalized SAR distributions for the two or more active antennas to generate the normalized SAR distribution for the time slot. For the case in which different transmission power levels are used for the active antennas, the processor 110 may scale the normalized SAR distribution for each active antenna by the transmission power level for the antenna.

In certain aspects, the transmit scenario and/or transmission power levels for the first technology may vary over the first time window 505. In these aspects, the transmit scenario may be approximately constant over one time slot, but may vary from time slot to time slot within the first time window 505. The processor 110 may determine the normalized SAR distribution for each time slot based on the transmit scenario and time-averaged transmission power levels for the time slot (e.g., according to equation (3a) or 3(b)).

The processor 110 may average the normalized SAR distributions 510(1)-510(p) over the first time window 505 to generate a time-averaged normalized SAR distribution 520. For example, the processor 110 may compute the time-averaged normalized SAR distribution 520 by combining the normalized SAR distributions 510(1)-510(p) for the time slots 515(1)-515(p) and dividing the resulting combined normalized SAR distribution by the number of time slots as given by the following:

$$\frac{1}{p}\sum_{j=1}^{j=p} SAR_{norm\_j} \leq 1 \qquad (9a)$$

where $SAR_{norm\_j}$ represents the normalized SAR distribution for the $j^{th}$ time slot 515(j). As discussed above, the normalized SAR distribution for a time slot may be a combination of multiple SAR distributions for the time slot (e.g., for the case of multiple active antennas). The processor 110 may then compare the peak value in the time-averaged normalized SAR distribution 520 with one to assess RF exposure compliance. If the peak value is equal to or less than one (i.e., satisfies the condition≤1), then the processor 110 may determine RF exposure compliance.

In certain aspects, the processor 110 may determine maximum allowable power levels for a future time slot to ensure time-average RF exposure compliance. In this regard, the time slots 515(1)-515(p−1) in FIG. 5 may correspond to previous transmissions by the wireless device 100, and the time slot 515(p) may correspond to the future time slot. In this regard, the time slot 515(p) is referred to as the future time slot below. Equation (9a) may be written as follows:

$$\frac{1}{p}\left[\left(\sum_{j=1}^{j=p-1} SAR_{norm\_j}\right) + SAR_{norm\_p}\right] \leq 1 \qquad (9b)$$

where $SAR_{norm\_p}$ is the SAR distribution for the future time slot 515(p).

In this example, it is assumed that the transmission power levels for the normalized SAR distributions 510(1)-510(p−1) are known by the processor 110 since they correspond to previous transmissions by the wireless device 100. For example, the processor 110 may record the transmission power levels and transmit scenario for each of the time slots 515(1)-515(p−1) in the memory 115, and use the recorded transmission power levels and transmit scenarios for the time slots 515(1)-515(p−1) to determine the normalized SAR distributions 510(1)-510(p−1) for these time slots. For time slots 515(1)-515(p−1), the normalized SAR distribution for the $j^{th}$ time slot 515(j) may be determined using equation (3a) or (3b) for all transmission scenarios and power levels that were active during the $j^{th}$ time slot 515(j).

In this example, the transmission power levels for the normalized SAR distribution 510(p) corresponding to the future time slot 515(p) are variables to be solved by the processor 110. To determine maximum allowable power levels for the future time slot 515(p), the processor 110 may compute the time-averaged normalized SAR distribution 520 in which the transmission power levels for the future time slot 515(p) are variables in the time-averaged normalized SAR distribution 520 (i.e., the time-averaged normalized SAR distribution is a function of the transmission power levels for the future time slot 515(p)). The processor 110 may then determine transmission power levels for the future time slot 515(p) such that the peak value in the time-averaged normalized SAR distribution is equal to or less than one (i.e., satisfies the condition≤1 in equation (9b)). The processor 110 uses the transmission power levels that satisfy the condition for RF exposure compliance as the maximum allowable power levels for the future time slot 515(p), and sets the transmission power limits for the future time slot 515(p) according to the determined maximum allowable power levels. The processor 110 may determine the maximum allowable power levels for the future time slot 515(p) during time slot 515(p−1) so that the maximum allowable power levels for the future time slot 515(p) are ready at the start of the future time slot 515(p) for the processor 110 to enforce the maximum allowable power levels.

Figure 6:
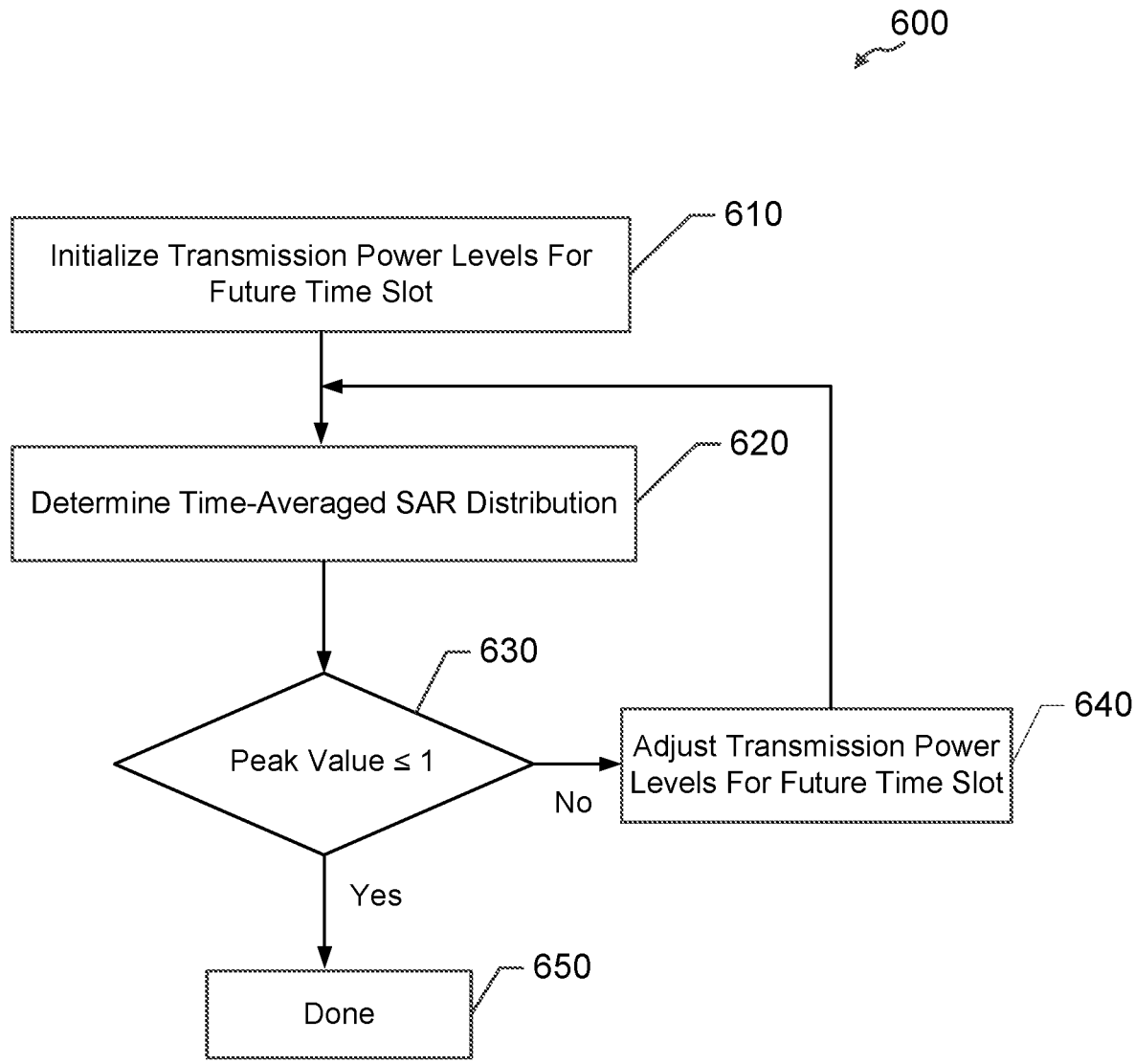
FIG. 6 is a flowchart illustrating an exemplary method for determining transmission power levels for a future time slot in compliance with a time-average SAR limit according to certain aspects of the present disclosure.

The processor 110 may determine the maximum allowable power levels for the future time slot 515(p) according to the exemplary method 600 illustrated in FIG. 6. At block 610, the processor 110 initializes the transmission power levels for the future time slot 515(p) according to the transmit scenario for the future time slot 515(p). The transmission power levels may be initialized according to a power control loop, a desired data rate, a desired beam direction or sector, etc. In one example, the transmission power levels may be initialized to a set of default transmission power levels.

At block 620, the processor 110 determines the time-averaged normalized SAR distribution based on the transmit scenario and transmission power levels at block 610 for the future time slot 515(p). Note that the transmission power levels for the previous time slots 515(1)-515(p−1) are known, as discussed above.

At block 630, the processor 110 compares the peak value in the time-averaged normalized SAR distribution with one to assess RF exposure compliance. If the peak value is equal to or less than one, then the method 600 ends at block 650. In this case, the processor 110 uses the transmission power levels initialized at block 610 as the maximum allowable power levels for the future time slot 515(p).

If the peak value is greater than one, then the processor 110 adjusts the transmission power levels for the future time slot at block 640. The processor 110 may adjust the transmission power levels for the future time slot by reducing one or more of the transmission power levels for the future time slot. The processor 110 then repeats blocks 620 and 630 using the adjusted transmission power levels. The processor 110 may repeat blocks 640, 620 and 630 until the peak value in the time-averaged normalized SAR distribution is equal or less than one, at which point the transmission power levels comply with the SAR limit and the processor 110 uses the transmission power levels that comply with the SAR limit as the maximum allowable power levels for the future time slot 515 (p).

For the example in which the first transmitter 120 transmits signals using multiple active antennas (e.g., two or more of antennas 122-1 to 122-N) during the future time slot 515(p), the maximum allowable power levels may include a maximum allowable power level for each of the active antennas. In this example, the processor 110 limits (constrains) the transmission power level for each of the active antennas by the respective maximum allowable power level.

It is to be appreciated that the present disclosure is not limited to the exemplary method 600 illustrated in FIG. 6, and that other methods may be employed to determine transmission power levels for the future time slot 515(p) such that the time-averaged normalized SAR distribution complies with the SAR limit. For example, the processor 110 may determine maximum allowable power levels that result in the peak value of the time-averaged normalized SAR distribution being equal to or less than a value that is less than one for a conservative approximate analysis to determine the maximum allowable power levels with fewer computations.

In certain cases, a regulator may require that a time-averaged PD distribution for the second technology not exceed a PD limit for the second technology. This allows the wireless device 100 to briefly exceed the PD limit as long as the time-averaged PD distribution does not exceed the PD limit.

In this regard, the processor 110 may determine RF exposure compliance for the case in which the second technology is active and the first technology is not active as follows. The processor 110 may compute a time-averaged normalized PD distribution over a second time window (e.g., 2 minutes), and compare the peak value in the time-averaged normalized PD distribution with one to assess RF exposure compliance. If the peak value is equal to or less than one (i.e., satisfies the condition≤1), then the processor 110 may determine RF exposure compliance.

Figure 7:
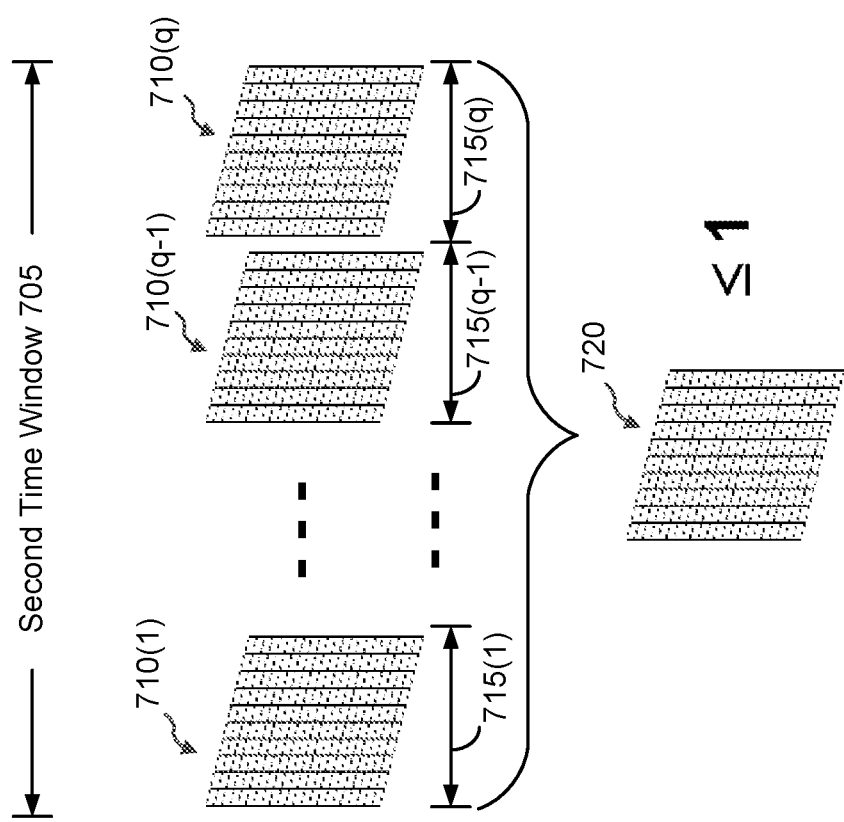
FIG. 7 shows an example of a time-averaged PD distribution according to certain aspects of the present disclosure.

In this regard, FIG. 7 illustrates an example in which the processor 110 computes a time-averaged normalized PD distribution over a second time window 705 (e.g., 2 minutes). In this example, the second time window 705 is divided into multiple time slots (i.e., time intervals). For instance, a 2-minute time window may be divided into 5-second time slots. In the example shown in FIG. 7, there are q number of time slots 715(1)-715(q), and q number of normalized PD distributions 710(1)-710(q). Although each of the distributions 710(1)-710(q) is depicted as a two-dimensional distribution in FIG. 7, it is to be appreciated that the present disclosure is not limited to this example.

The processor 110 may determine a normalized PD distribution for each time slot (e.g., according to equation (6a) or (6b)). The normalized PD distribution for a time slot may be generated by combining two or more PD distributions. For example, if two or more antennas are active during the time slot, then the processor 110 may combine the normalized PD distributions for the two or more active antennas to generate the normalized PD distribution for the time slot. For the case in which different transmission power levels are used for the active antennas, the processor 110 may scale the normalized PD distribution for each active antenna by the respective transmission power level.

In certain aspects, the transmit scenario and/or transmission power levels for the second technology may vary over the second time window 705. In these aspects, the transmit scenario may be approximately constant over one time slot, but may vary from time slot to time slot within the second time window 705. The processor 110 may determine the normalized PD distribution for each time slot based on the transmit scenario and time-averaged transmission power levels during the time slot (e.g., according to equation (6a) or (6b)).

The processor 110 may average the normalized PD distributions 710(1)-710(q) over the second time window 705 to generate a time-averaged normalized PD distribution 720. For example, the processor 110 may compute the time-averaged normalized PD distribution 720 by combining the normalized PD distributions 710(1)-710(q) for the time slots 715(1)-715(q) and dividing the resulting combined normalized PD distribution by the number of time slots as given by the following:

$$\frac{1}{q}\sum_{j=1}^{j=q} PD_{norm\_j} \le 1 \qquad (10a)$$

where $PD_{norm\_j}$ represents the normalized PD distribution for the $j^{th}$ time slot 715(j). As discussed above, the normalized PD distribution for a time slot may be a combination of multiple normalized PD distributions for the time slot (e.g., for the case of multiple active antennas). The processor 110 may then compare the peak value in the time-averaged normalized PD distribution 720 with one to assess RF exposure compliance. If the peak value is equal to or less than one (i.e., satisfies the condition≤1), then the processor 110 may determine RF exposure compliance.

In certain aspects, the processor 110 may determine maximum allowable power levels for a future time slot to ensure time-averaged RF exposure compliance. In this regard, the time slots 715(1)-715(q−1) in FIG. 7 may correspond to previous transmissions by the wireless device 100, and the time slot 715(q) may correspond to a future transmission. In this regard, the time slot 715(q) is referred to as the future time slot below. Equation (10a) may be rewritten as follows:

$$\frac{1}{q}\left[\left(\sum_{j=1}^{j=q-1} PD_{norm\_j}\right) + PD_{norm\_p}\right] \le 1 \qquad (10b)$$

where $PD_{norm\_q}$ is the normalized PD distribution for the future time slot 715(q).

In this example, it is assumed that the transmission power levels for the normalized PD distributions 710(1)-710(q−1) are known by the processor 110 since they correspond to previous transmissions by the wireless device 100. For example, the processor 110 may record the transmission power levels and transmit scenario for each of the time slots 715(1)-715(q−1) in the memory 115, and use the recorded transmission power levels and transmit scenarios for the time slots 715(1)-715(q−1) to determine the normalized PD distributions 710(1)-710(q−1) for these time slots. For time slots 715(1)-715(q−1), the normalized PD distribution 710 (j) for the $j^{th}$ time slot 715(j) may be determined using equation (6a) or (6b) for all transmission scenarios and power levels that were active during the $j^{th}$ time slot 715(j).

In this example, the transmission power levels for the normalized PD distribution 710(q) corresponding to the future time slot 715(q) are variables to be solved by the processor 110. To determine the maximum allowable power levels for the future time slot 715(q), the processor 110 may compute the time-averaged normalized PD distribution 720 in which the transmission power levels for the future time slot 715(q) are variables in the time-averaged normalized PD distribution 720 (i.e., the time-averaged normalized PD distribution 720 is a function of the transmission power levels for the future time slot 715(q)). The processor 110 may then determine transmission power levels for the future time slot 715(q) such that the peak value in the time-averaged normalized PD distribution is equal to or less than one (i.e., satisfies the condition≤1 in equation (10b)). The determined transmission power levels that comply with RF exposure levels are used as the maximum allowable power levels for the future time slot 715(q). In this regard, the processor 110 sets the transmission power limits for the future time slot 715(q) according to the determined maximum allowable power levels. The processor 110 may determine the maximum allowable power levels for the future time slot 715(q) during time slot 715(q−1) so that the maximum allowable power levels for the future time slot 715(q) are ready at the start of the future time slot 715(q) for the processor 110 to enforce the maximum allowable power levels.

Figure 8:
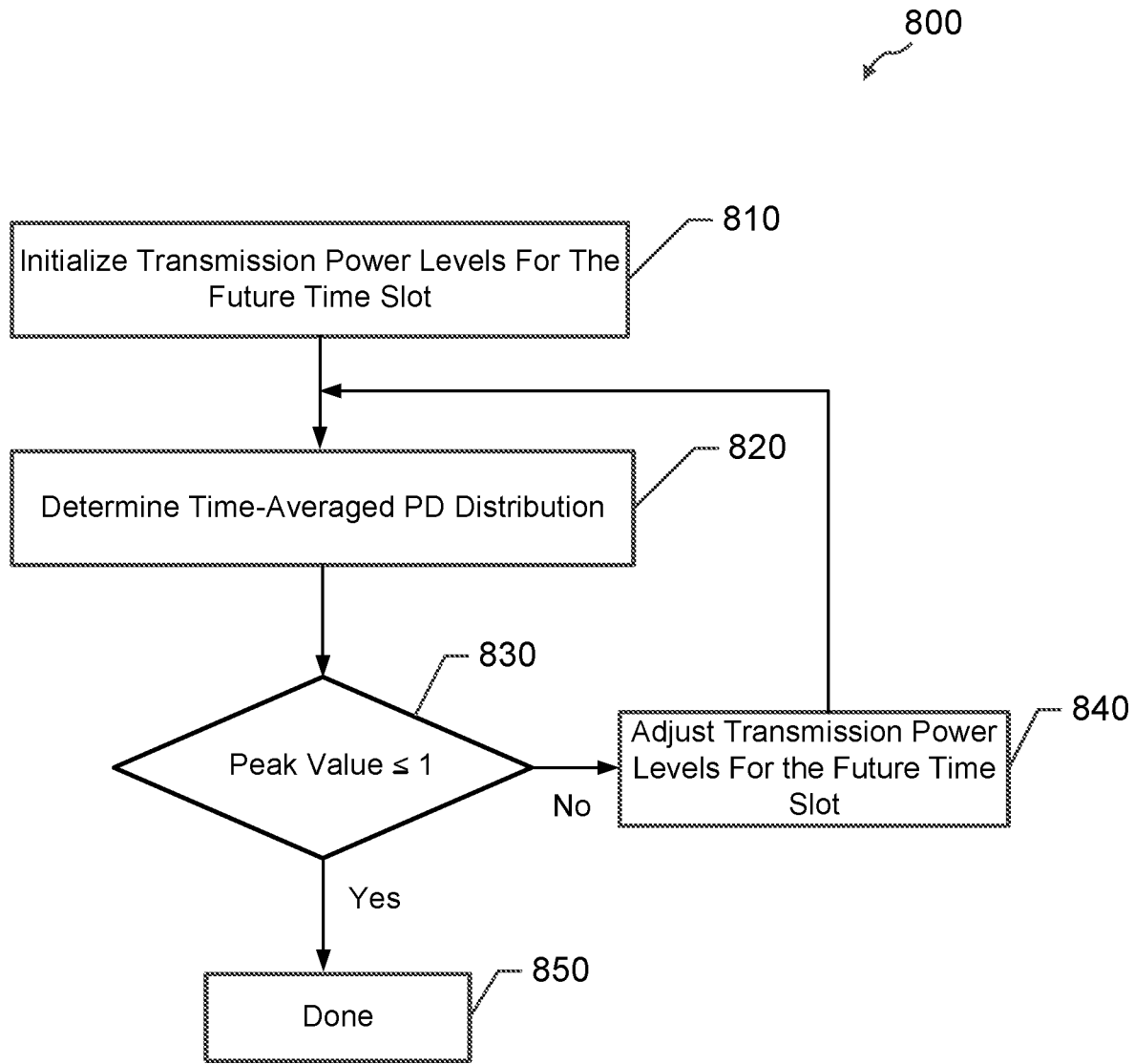
FIG. 8 is a flowchart illustrating an exemplary method for determining transmission power levels that comply with a time-average PD limit according to certain aspects of the present disclosure.

The processor 110 may determine the maximum allowable power levels for the future time slot 715(q) according to the exemplary method 800 illustrated in FIG. 8. At block 810, the processor 110 initializes the transmission power levels for the future time slot 715(q) according to the transmit scenario for the future time slot 715(q). For example, the transmission power levels may be initialized according to a power control loop, a desired data rate, a desired beam direction or sector, etc. In one example, the transmission power levels may be initialized to a set of default transmission power levels.

At block 820, the processor 110 determines the time-averaged normalized PD distribution based on the transmit scenario and transmission power levels at block 810 for the future time slot 715(q). Note that the transmission power levels for the previous time slots 715(1)-715(q−1) are known, as discussed above.

At block 830, the processor 110 compares the peak value in the time-averaged normalized PD distribution with one to assess RF exposure compliance. If the peak value is equal to or less than one, then the method 800 ends at block 850. In this case, the processor 110 uses the transmission power levels initialized at block 810 as the maximum allowable power levels for the future time slot 715(q).

If the peak value is greater than one, then the processor 110 adjusts the transmission power levels 810 for the future time slot at block 840. The processor 110 may adjust the transmission power levels for the future time slot 715(q) by reducing one or more of the transmission power levels for the future time slot 715(q). The processor 110 then repeats blocks 820 and 830 using the adjusted transmission power levels. The processor 110 may repeat blocks 840, 820 and 830 until the peak value in the time-averaged PD distribution is equal or less than one, at which point the transmission power levels comply with the PD limit and the processor 110 uses the transmission power levels as the maximum allowable power levels for the future time slot 715(q).

For the example in which the second transmitter 130 transmits signals using multiple active antennas (e.g., two or more of antennas 132-1 to 132-M) during the future time slot 715(q), the maximum allowable power levels may include a maximum allowable power level for each of the active antennas. In this example, the processor 110 limits (constrains) the transmission power level for each of the active antennas by the respective maximum allowable power level.

It is to be appreciated that the present disclosure is not limited to the exemplary method 800 illustrated in FIG. 8, and that other methods may be employed to determine transmission power levels for the future time slot 715($q$) such that the time-averaged normalized PD distribution complies with the PD limit. For example, the processor 110 may determine maximum allowable power levels for the future time slot 715($q$) that result in the peak value in the time-averaged normalized PD distribution being approximately equal to or less than a value that is less than one.

Figure 9:
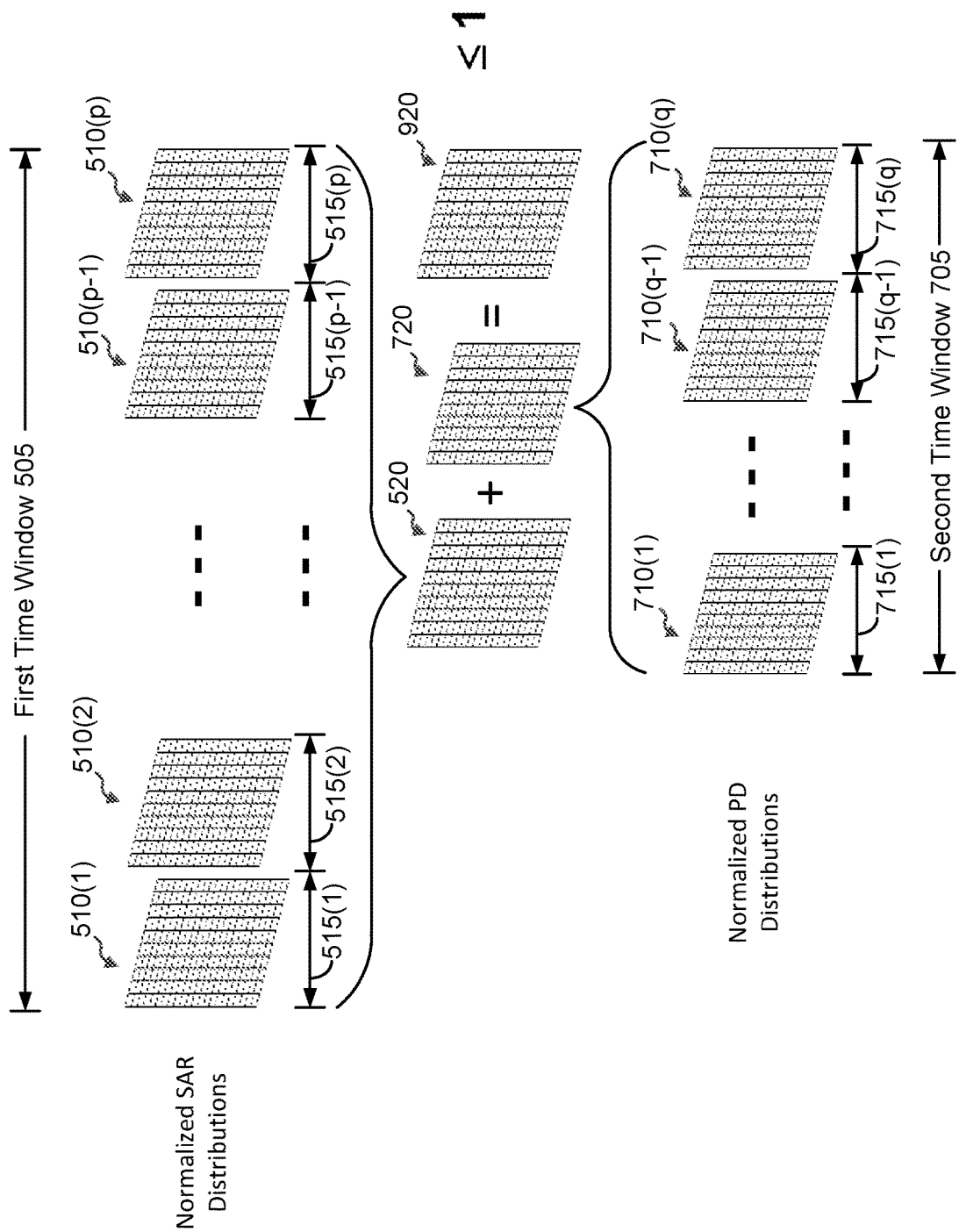
FIG. 9 shows an example of a time-averaged SAR distribution combined with a time-averaged PD distribution according to certain aspects of the present disclosure.

The processor 110 may also determine time-averaged RF exposure compliance for the case where both the first technology and the second technology are active (i.e., the wireless device simultaneously transmits signals using the first and second technologies). To do this, the processor 110 may combine the time-averaged normalized SAR distribution 520 and the time-averaged normalized PD distribution 720 to generate a combined time-averaged normalized distribution 920, as illustrated in FIG. 9. The processor 110 may then compare the peak value in the combined time-averaged normalized distribution 920 with one to assess time-averaged RF exposure compliance. If the peak value is equal to or less than one (i.e., satisfies the condition≤1), then the processor 110 may determine that the wireless device 100 is compliant. The condition for compliance may be given by combining equations (9b) and (10b) as follows:

$$\frac{1}{p}\left[\left(\sum_{j=1}^{j=p-1} SAR_{norm_{combined_j}}\right) + SAR_{norm_{combined_p}}\right] + \frac{1}{q}\left[\left(\sum_{j=1}^{j=q-1} PD_{norm\_combined\_j}\right) + PD_{norm\_combined\_q}\right] \le 1. \quad (11)$$

The first time window 505 for the time-averaged normalized SAR distribution and the second time window 705 for the time-averaged normalized PD distribution may be different in length. In this regard, FIG. 9 shows an example in which the first time window 505 is longer than the second time window 705. For example, the first time window 505 may be approximately 6 minutes in length and the second time window 705 may be approximately 2 minutes in length. The lengths of the first and second time windows may be specified by respective RF exposure regulations (e.g., established by the FCC or other regulatory body). Note that the lengths of the time windows 505 and 705 are not drawn to scale in FIG. 9.

In certain aspects, the processor 110 may determine maximum allowable power levels for the future time slots 515($p$) and 715($q$) of the first and second technologies to ensure time-averaged RF exposure compliance. In these aspects, the future time slots 515($p$) and 715($q$) may be approximately aligned in time as shown in the example in FIG. 9. To determine the maximum allowable power levels for the future time slots 515($p$) and 715($q$), the processor 110 may compute the combined time-averaged normalized distribution 920 in which the transmission power levels for the future time slots 515($p$) and 715($q$) are variables in the combined time-averaged normalized distribution 920 (i.e., the combined time-averaged normalized distribution 920 is a function of the transmission power levels for the future time slots 515($p$) and 715($q$)). The processor 110 may then determine the maximum allowable power levels for the future time slots 515($p$) and 715($q$) such that the peak value in the combined time-averaged normalized distribution 920 is equal to or less than one (i.e., satisfies the condition≤1 in equation (11)). The processor 110 may then set the transmission power limits for the future time slots 515($p$) and 715($q$) according to the determined maximum allowable power levels.

Figure 10:
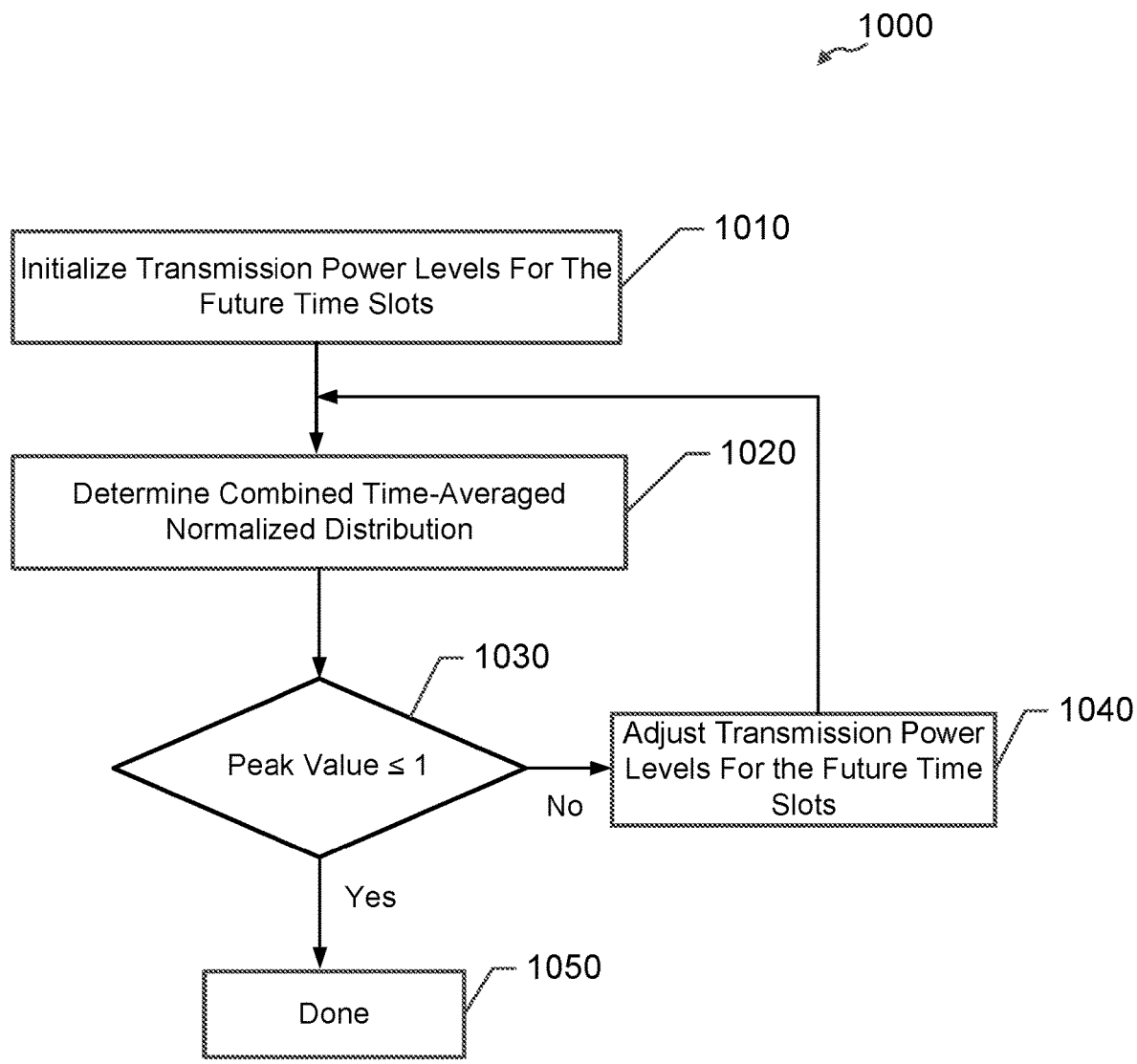
FIG. 10 is a flowchart illustrating an exemplary method for determining transmission power levels that comply with time-average RF exposure limits according to certain aspects of the present disclosure.

The processor 110 may determine the maximum allowable power levels for the future time slots 515($p$) and 715($q$) according to the exemplary method 1000 illustrated in FIG. 10. The maximum allowable power levels may include first maximum allowable power levels for the first technology and second maximum allowable power levels for the second technology.

At block 1010, the processor 110 initializes the transmission power levels for the future time slots 515($p$) and 715($q$) according to the transmit scenarios for the future time slots 515($p$) and 715($q$). If the transmit scenario for the future time slot 515($p$) for the first technology uses multiple active antennas, then the transmission power levels may include a transmission power level for each of the active antennas. Similarly, if the transmit scenario for the future time slot 715($q$) for the second technology uses multiple active antennas, then the transmission power levels may include a transmission power level for each of the active antennas.

The transmission power levels may be initialized according to one or more power control loops, one or more desired data rates, one or more desired beam directions or sectors, etc. In one example, the transmission power levels may be initialized to a set of default transmission power levels.

At block 1020, the processor 110 determines the combined time-averaged normalized distribution 920 based on the transmission power levels for the future time slots 515($p$) and 715($q$). Note that the transmission power levels in the previous time slots 515(1)-515($p$−1) for the first technology and the transmission power levels in the previous time slots 715(1)-715($q$−1) for the second technology are known, as discussed above.

At block 1030, the processor 110 compares the peak value in the combined time-averaged normalized distribution with one to assess RF exposure compliance. If the peak value is equal to or less than one, then the method 1000 ends at block 1050. In this case, the processor 110 uses the transmission power levels initialized at block 1010 as the maximum allowable power levels for the future time slots 515($p$) and 715($q$).

If the peak value is greater than one, then the processor 110 adjusts the transmission power levels for the future time slots at block 1040. The processor 110 may adjust the transmission power levels for the future time slots by reducing one or more of the transmission power levels for the future time slots. The processor 110 then repeats blocks 1020 and 1030 using the adjusted transmission power levels. The processor 110 may repeat blocks 1040, 1020 and 1030 until the peak value in the combined time-averaged normalized distribution is equal or less than one, at which point the transmission power levels for the future time slots are compliant and the processor 110 uses the transmission power levels as the maximum allowable power levels. The determined maximum allowable power levels include the first maximum allowable power levels for the first technology and the second maximum allowable power levels for the second technology. In this regard, the processor 110 sets the transmission power limits for the first transmitter 120 according to the first maximum allowable power levels and sets the transmission power limits for the second transmitter 130 according to the second maximum allowable power levels.

It is to be appreciated that the present disclosure is not limited to the exemplary method 1000 illustrated in FIG. 10, and that other methods may be employed to determine maximum allowable power levels for the future time slots 515($p$) and 715($q$) such that the combined time-averaged normalized distribution 920 complies with the RF exposure limits.

In certain aspects, the time-averaging window for PD is dependent on transmitting frequency (e.g., ~2 minutes in 28 GHz band and ~1 minute in 60 GHz). In these aspects, when the second transmitter 130 transmits signals at multiple frequency bands, the time-average PD distribution may be computed using a different time window for each frequency band. For example, if the second transmitter 130 transmits signals at a first frequency band (e.g., 28 GHz) and a second frequency band (e.g., 60 GHz), the time-average PD distribution may be given by:

$$\frac{1}{q}\sum_{j=1}^{j=q} PD_{norm\_j} + \frac{1}{r}\sum_{j=1}^{j=r} PD_{norm\_j} \qquad (12)$$

where q is the number of time slots for the first frequency band (e.g., 28 GHz band), and r is the number of time slots for the second frequency band (e.g., 60 GHz band). Since different time windows are used for the first and second frequency bands, the number of time slots for the frequency band is different from the number of time slots for the second frequency band (i.e., q and r are different).

Figure 11:
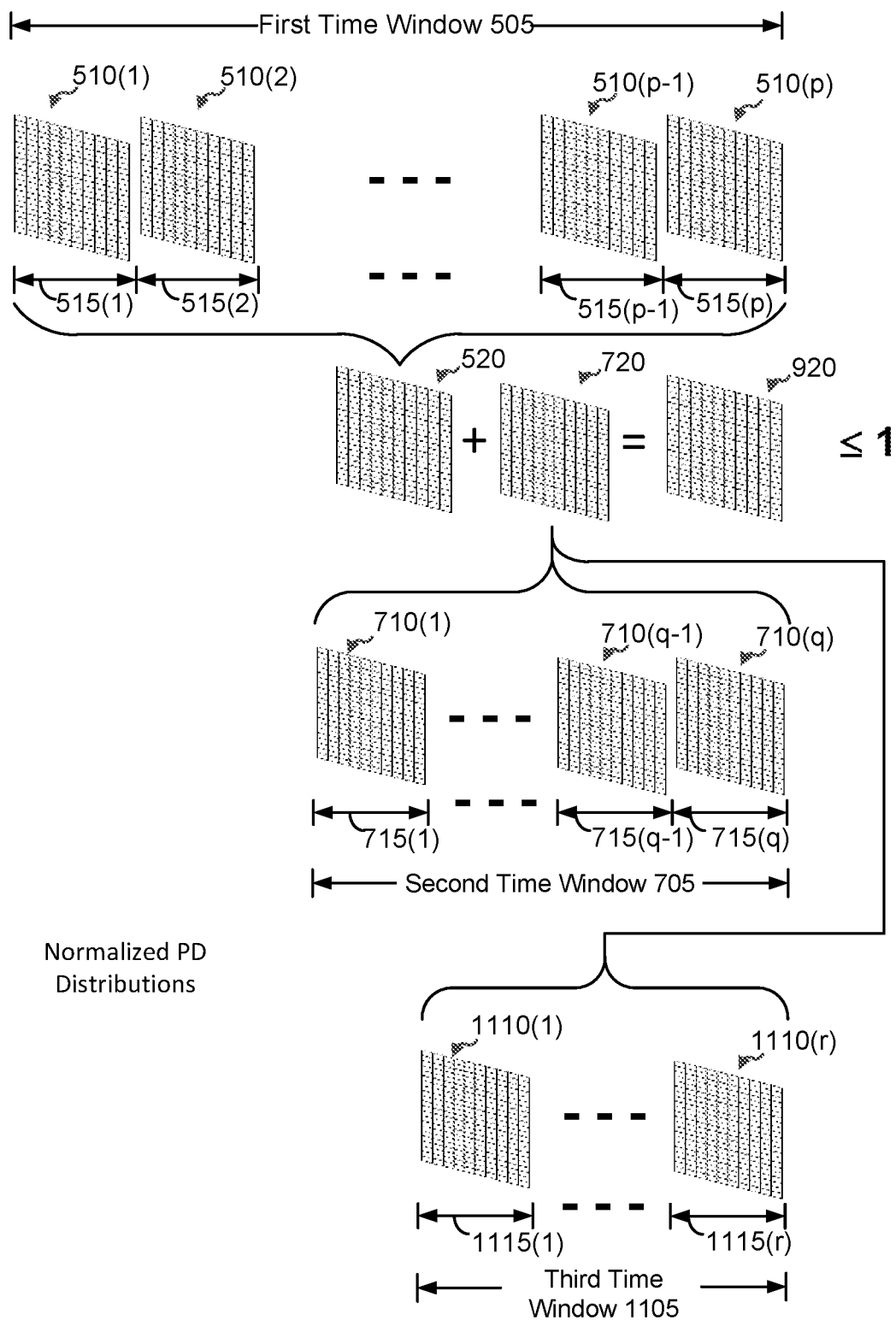
FIG. 11 shows an example in which a time-averaged PD distribution is determined using multiple time-averaging windows for different frequency bands according to certain aspects of the present disclosure.

FIG. 11 shows an example in which two time-averaging windows are used for PD. In this example, the second time window 705 discussed above is used for the first frequency band (e.g., 28 GHz band) and a third time window 1105 is used for the second frequency band (e.g., 60 GHz band), in which the third time window 1105 is shorter than the second time window 705. For example, the second time window 705 may have a length of approximately two minutes and the third time window 1105 may have a length of approximately one minute.

As shown in FIG. 11, the third time window 1105 is divided into r number of time slots 1115(1) to 1115($r$). There are r number of normalized PD distributions 1110(1) to 1110($r$) for the second frequency band, where each normalized PD distribution corresponds to a respective one of the time slots 1115(1) to 1115($r$). In this example, time slots 1115(1) to 1115($r$-1) correspond to previous time slots and time slot 1115($r$) corresponds to a future time slot approximately aligned with future time slots 515($p$) and 715($q$).

In this example, the normalized PD distribution for each of the previous time slots 715(1) to 715($q$-1)) in the second time window 705 may be determined based on the transmit scenario and transmission power levels for the first frequency band during the time slot. The normalized PD distribution for the future time slot 715($q$) is a function of transmission power levels for the first frequency band in the future time slot 715($q$). Similarly, the normalized PD distribution for each of the previous time slots 1115(1) to 1115($r$-1) in the third time window 1105 may be determined based on the transmit scenario and transmission power levels for the second frequency band during the time slot. The normalized PD distribution for the future time slot 1115($r$) is a function of transmission power levels for the second frequency band in the future time slot 1115($r$).

The time-average normalized PD distribution 720 may be computed according to equation (12) above, in which the time-average normalized PD distribution is a function of the transmission power levels for the first frequency band in the future time slot 715($q$) and the transmission power levels for the second frequency band in the future time slot 1115($r$).

In this example, the time-average normalized PD distribution 720 is a combination of the time-average normalized PD distribution for the first frequency band corresponding to the second time window 705 and the time-average normalized PD distribution for the second frequency band corresponding to the third time window 1105. In this regard, the time-average PD distribution 720 may be considered a combined time-averaged PD distribution.

For the example in which the wireless device 100 also transmits signals using the first technology, the time-averaged normalized PD distribution may be combined with the time-averaged normalized SAR distribution to obtain the combined time-averaged normalized distribution discussed above. In this example, the combined time-averaged normalized distribution is a function of the transmit scenario and transmission power levels for the first technology in the future time slot 515($p$), the transmit scenario and transmission power levels for the first frequency band in the future time slot 715($q$), and the transmit scenario and transmission power levels for the second frequency band in the future time slot 1115($r$). The maximum allowable power levels may be determined by determining transmission power levels that result in the peak value of the combined time-averaged normalized distribution being equal to or less than one (e.g., according to the method 1000 illustrated in FIG. 10). In this example, the maximum allowable power levels include maximum allowable power levels for the first technology, maximum allowable power levels for the first frequency band, and maximum allowable power levels for the second frequency band. During the future time slots 515($p$), 715($q$) and 1115($r$), the processor 110 sets the transmission power limits for the first technology according to the maximum allowable power levels for the first technology, sets the transmission power limits for the first frequency band according to the maximum allowable power levels for the first frequency band, and sets the transmission power limits for the second frequency band according to the maximum allowable power levels for the second frequency band.

Although two time-averaging widows 705 and 1105 are used for PD in the above example, it is to be appreciated that more than two time-averaging widows may be used depending on the number of different frequency bands above 10 GHz that are active. In general, the number of time-averaging windows used for PD may be equal to the number of active frequency bands above 10 GHz, where each time-averaging window corresponds to a respective one of the active frequency bands.

Figure 12:
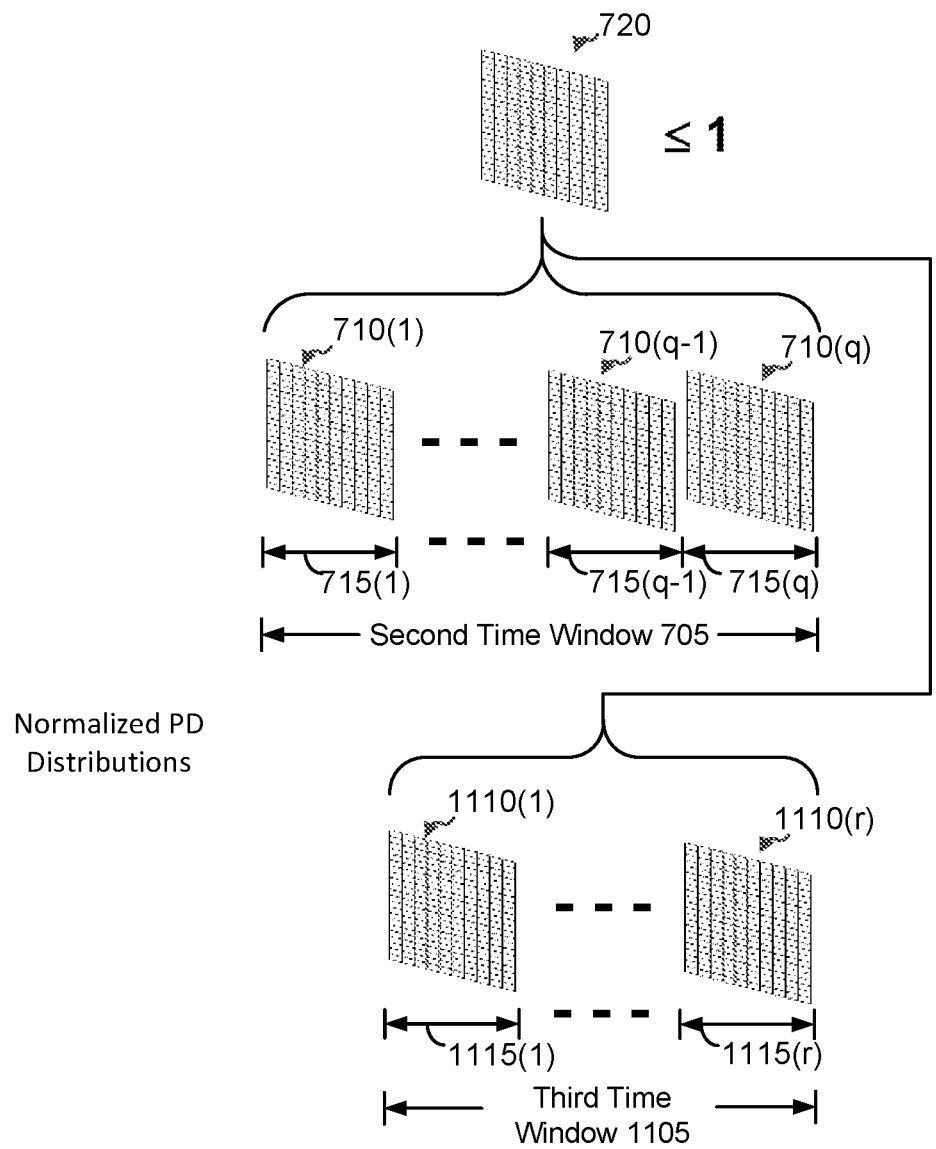
FIG. 12 shows an example in which a time-averaged PD distribution is determined for simultaneous transmissions at different frequency bands according to certain aspects of the present disclosure.

In certain aspects, the wireless device 110 may simultaneously transmit signals at the first and second frequency bands (e.g., 28 GHz and 60 GHz) while the first technology is not active. In this case, the processor 110 may determine maximum allowable power levels for the first and second frequency bands as follows. The processor may determine the time-average normalized PD distribution according to equation (12) in which the time-average normalized PD distribution is a function of the transmission power levels for the first frequency band in future time slot 715($q$) and the transmission power levels for the second frequency band in future time slot 1115($r$). An example of this is illustrated in FIG. 12, in which the condition for RF exposure compliance is that the time-averaged normalized PD distribution 720 be equal to or less than one. Note that the time-average normalized PD distribution is not combined with the time-averaged normalized SAR distribution 520 in this case since the first technology is not active in this case.

The processor 110 may then determine transmission power levels for the first frequency band and second frequency band that result in the peak value in the time-average normalized PD distribution being equal to or less than one, and use the determine transmission power levels as the maximum allowable power levels. In this example, the maximum allowable power levels include maximum allowable power levels for the first frequency band, and maximum allowable power levels for the second frequency band. During the future time slots 715($q$) and 1115($r$), the processor 110 sets the transmission power limits for the first frequency band according to the maximum allowable power levels for the first frequency band and sets the transmission power limits for the second frequency band according to the maximum allowable power levels for the second frequency band. It is to be appreciated that the above technique may be expanded to three or more frequency bands to determine maximum allowable power levels for three or more frequency bands.

Figure 13:
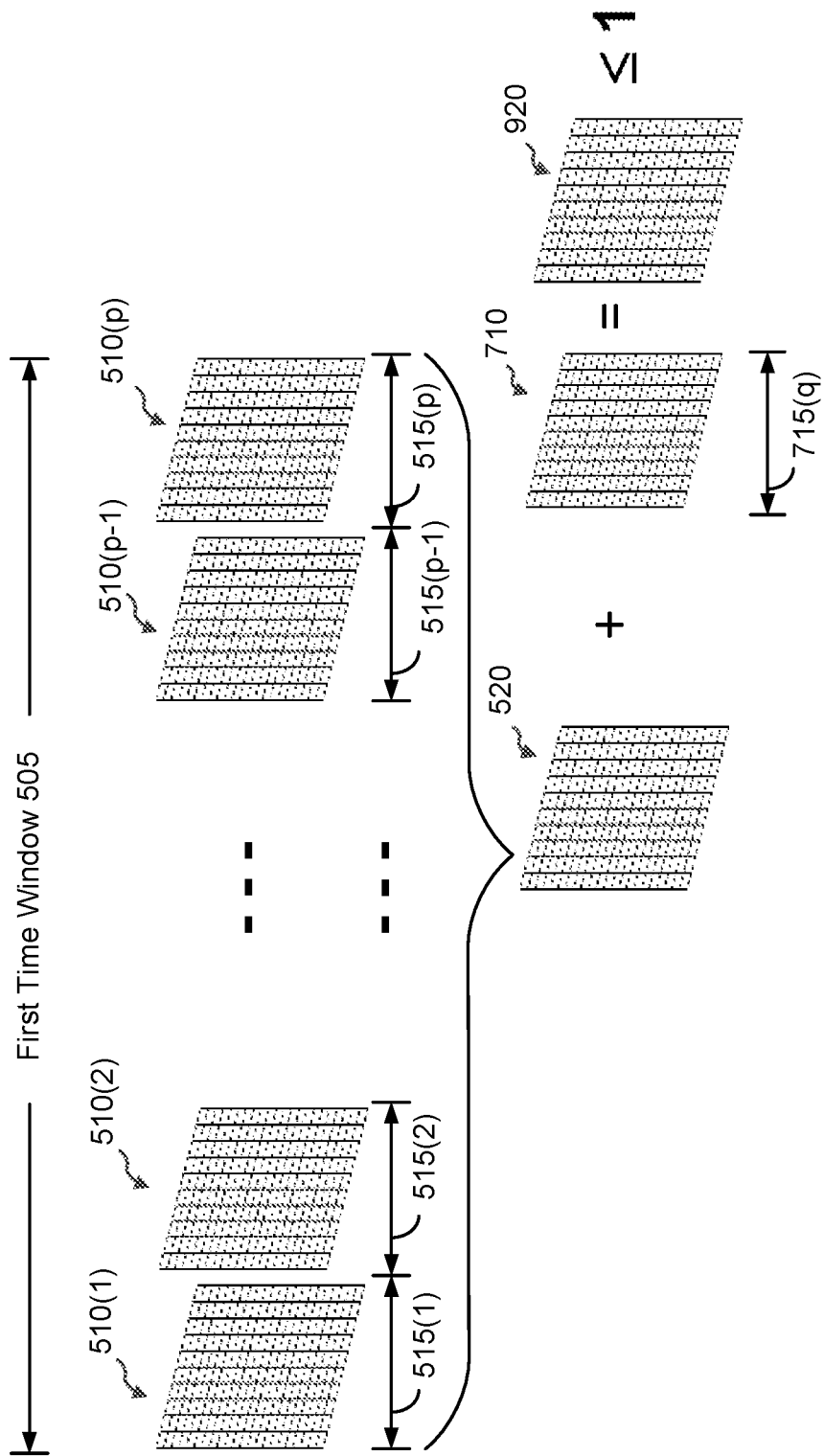
FIG. 13 shows an example of a time-averaged SAR distribution combined with a PD distribution according to certain aspects of the present disclosure.

Some RF exposure regulations may not require time averaging of PD or may not currently specify time-averaging for PD (which could change). In these cases, the time-averaged SAR distribution may be combined with a normalized PD distribution to assess RF exposure compliance. An example of this is illustrated in FIG. 13 in which the time-averaged normalized SAR distribution 520 is combined with the normalized PD distribution for the future time slot 715($q$) to obtain the combined normalized distribution 920.

In this example, the processor 110 may determine maximum allowable power levels for the first and second technologies as follows. The processor 110 combines the time-averaged normalized SAR distribution 520 with the normalized PD distribution 710 for the future time slot 715($q$) to obtain the combined normalized distribution 920 in which the combined normalized distribution 920 is a function of the transmission power levels for the first technology in future time slot 515($p$) and the transmission power levels for the second technology in future time slot 715($q$).

The processor 110 may then determine transmission power levels for the first and second technologies that result in the peak value in the normalized distribution 920 being equal to or less than one, and use the determined transmission power levels as the maximum allowable power levels. In this example, the maximum allowable power levels include maximum allowable power levels for the first technology, and maximum allowable power levels for the second technology. During the future time slots 515($p$) and 715($a$), the processor 110 sets the transmission power limits for the first transmitter 120 according to the maximum allowable power levels for the first technology and sets the transmission power limits for the second transmitter 130 band according to the maximum allowable power levels for the second technology.

It is to be appreciated that the time slots 515(1)-515($p$) discussed above may be equal in length or that two or more of the time slots 515(1)-515($p$) may have different lengths. The future time slot 515($p$) may also be referred to as a time interval and may have a length that is equal to or less than a tenth the length of the first time window 505. In one example, the future time slot 515($p$) has a length of approximately 5 seconds and the first time window 505 has a length of approximately 6 minutes.

It is to be appreciated that the time slots 715(1)-715($q$) discussed above may be equal in length or that two or more of the time slots 715(1)-715($q$) may have different lengths. The future time slot 715($q$) may also be referred to as a time interval and may have a length that is equal to or less than a fifth the length of the second time window 705. In one example, the future time slot 715($q$) has a length of approximately 5 seconds and the second time window 705 has a length of approximately 2 minutes.

It is to be appreciated that the time slots 1115(1)-1115($r$) discussed above may be equal in length or that two or more of the time slots 1115(1)-1115($r$) may have different lengths. The future time slot 1115($r$) may also be referred to as a time interval and may have a length that is equal to or less than a fifth the length of the third time window 1105. In one example, the future time slot 1115($r$) has a length of approximately 5 seconds and the third time window 1105 has a length of approximately one minute.

The first time window 505 may have a length that is at least 50 percent longer than the length of the second time window 705. In one example, the first time window 505 has a length of approximately 6 minutes, and the second time window 705 has a length of approximately 2 minutes, in which the lengths of the first and second time windows may be set by regulatory bodies. It is to be appreciated that the lengths of the first and second time windows 505 and 705 set by the regulator bodies may change with time, and may vary between different regulatory bodies. As discussed above, regulatory bodies may define time windows that are dependent on transmitting frequency, for example, time-window length of 2 minutes for 28 GHz band and time-window length of one minute for 60 GHz bands. In that case, it is to be also appreciated that there could be one time window for SAR and two or more time windows for PD with each time window for PD corresponding to a given transmission frequency band.

As used herein, the term "previous time slots" refers to time slots prior to the respective future time slot. For example, time slots 515(1)-515($p$−1) in FIG. 5 are previous time slots, which are prior to future time slot 515($p$).

As used herein, the term "future time slot" refers to a time slot (i.e., time interval or time duration) in the future with respect to the time that the respective maximum allowable power levels are determined. Determining the maximum allowable power levels for the future time slot before the future time slot helps ensure RF exposure compliance during the future time slot. Since the future time slots 515($p$), 715($q$) and 1115($r$) discussed above are approximately aligned in time, they may collectively be considered one future time slot.

It is to be appreciated that the time windows discussed above (e.g., time windows 505, 705 and 1105) may be moving time-averaging windows. In this case, each time window is shifted by one time slot each time the maximum allowable power levels for a new future time slot are determined. For example, in the above discussion of time window 505, time slot 515($p$) is given as the future time slot. To determine the maximum allowable power levels for the next future time slot 515($p$+1), the processor 110 shifts the time window 505 by one time slot to cover time slots 515(2) to 515($p$+1). Note that the first time slot 515(1) in the previous determination of the maximum allowable power levels is dropped from the time window 505, and the future time slot 515($p$) in the previous determination of the maximum allowable power levels becomes the last one of the previous time slots in the time window 505.

It is to be appreciated that the first communication technology discussed above may include multiple communication technologies in which SAR is used to assess RF exposure compliance. For example, the first technology may include WWAN, WLAN, Bluetooth, etc. In this regard, it is to be appreciated that the first transmitter 120 may include multiple transmitters. Also, it is to be appreciated that SAR may have contributions from multiple sub-6 GHz communication technologies (e.g., simultaneous transmissions of WWAN, WLAN and Bluetooth).

It is to be appreciated that the second communication technology discussed above may include multiple communication technologies in which PD is used to assess RF exposure compliance. For example, the second technology may include mmWave/5G and mmWave/802.11ad. In this regard, it is to be appreciated that the second transmitter 130 may include multiple transmitters. Also, it is to be appreciated that PD may have contributions from multiple communication technologies (e.g., simultaneous transmissions of mmWave/5G and mmWave/802.11ad).

In some of the examples given above, a normalized distribution is compared with one to assess RF exposure compliance. However, it is to be appreciated that the present disclosure is not limited to these examples. For example, a distribution (e.g., SAR distribution, PD distribution, combined RF exposure distribution, etc.) may be normalized relative to any value such that a limit value other than one may be used to define the condition for RF exposure compliance. In this example, the condition for RF compliance is that the normalized distribution be equal to or less than the limit value. Also, as discussed above, the limit value may be set to a value less than one.

As discussed above, the processor 110 may determine a maximum allowable power level for a transmitter (e.g., the first transmitter 120 or the second transmitter 130) for a future time slot (e.g., according to any of the methods described herein) and set a transmission power limit for the transmitter based on the determined maximum allowable power level. In certain aspects, setting the transmission power limit based on the determined maximum allowable power level prevents a power level of the transmitter from exceeding the maximum allowable power level at any time during the future time slot. In certain aspects, setting the transmission power limit based on the determined maximum allowable power level prevents a time-average of a power level of the transmitter over the future time slot from exceeding the maximum allowable power level. This allows the power level to temporarily exceed the maximum allowable power level within the future time slot as long as the time-average of the power level over the future time slot does not exceed the maximum allowable power level. In these aspects, the power level may exceed the maximum allowable power level for a time interval shorter than the future time slot. In these aspects, the maximum allowable power level is a maximum allowable time-averaged power level over the future time slot.

It is to be appreciated that a device which is transmitting need not calculate a combined and/or normalized distribution (e.g., as recited in FIGS. 3, 4, 6, 8, and 10, and described with respect to other figures) in all examples. In some aspects, a combined and/or normalized distribution may be computed in a lab or otherwise a priori, and the transmitting device (e.g., the device 100 or device performing one or more of blocks 340, 440, 640, 840, 1040, etc.) may determine a power for transmission based thereon. In some aspects, one or more combined and/or normalized distributions may be stored or otherwise characterized in a memory (e.g., the memory 115). In some aspects, a transmitting device (or processor of such device) may be assigned or determine a certain amount of power which will comply with any restrictions that would be necessary to satisfy a combined and/or normalized distribution as described above. That device or processor, however, may not itself calculate the combined distribution in some examples, but may use the certain amount of power to calculate or determine the maximum allowable (time-averaged) power lever for the future time slot. The device or processor may normalize its own transmissions with respect to the certain amount of power. In some examples, the device or processor assumes that any other transmitters are simultaneously transmitting at full power. Thus, time averaging may be performed with respect to one or more transmitters (e.g., by one or more processors associated with those transmitters) independent of, or without knowledge of, the actions of other transmitters and/or processors in a manner which complies with all exposure requirements. It will be understood that in all examples discussed above and herein relating to determining a combined and/or normalized exposure, the operations described in this paragraph may be utilized.

As discussed above, transmission power levels may be reduced to meet RF exposure compliance for a future time slot. In this regard, exemplary methods for reducing transmission power levels to meet RF exposure compliance for a future time slot are discussed below according to certain aspects of the present disclosure. The exemplary methods may be applied to the case where SAR exposure is assessed, the case where PD exposure is assessed, and the case where combined SAR and PD exposure is assessed, as discussed further below.

Figure 14:
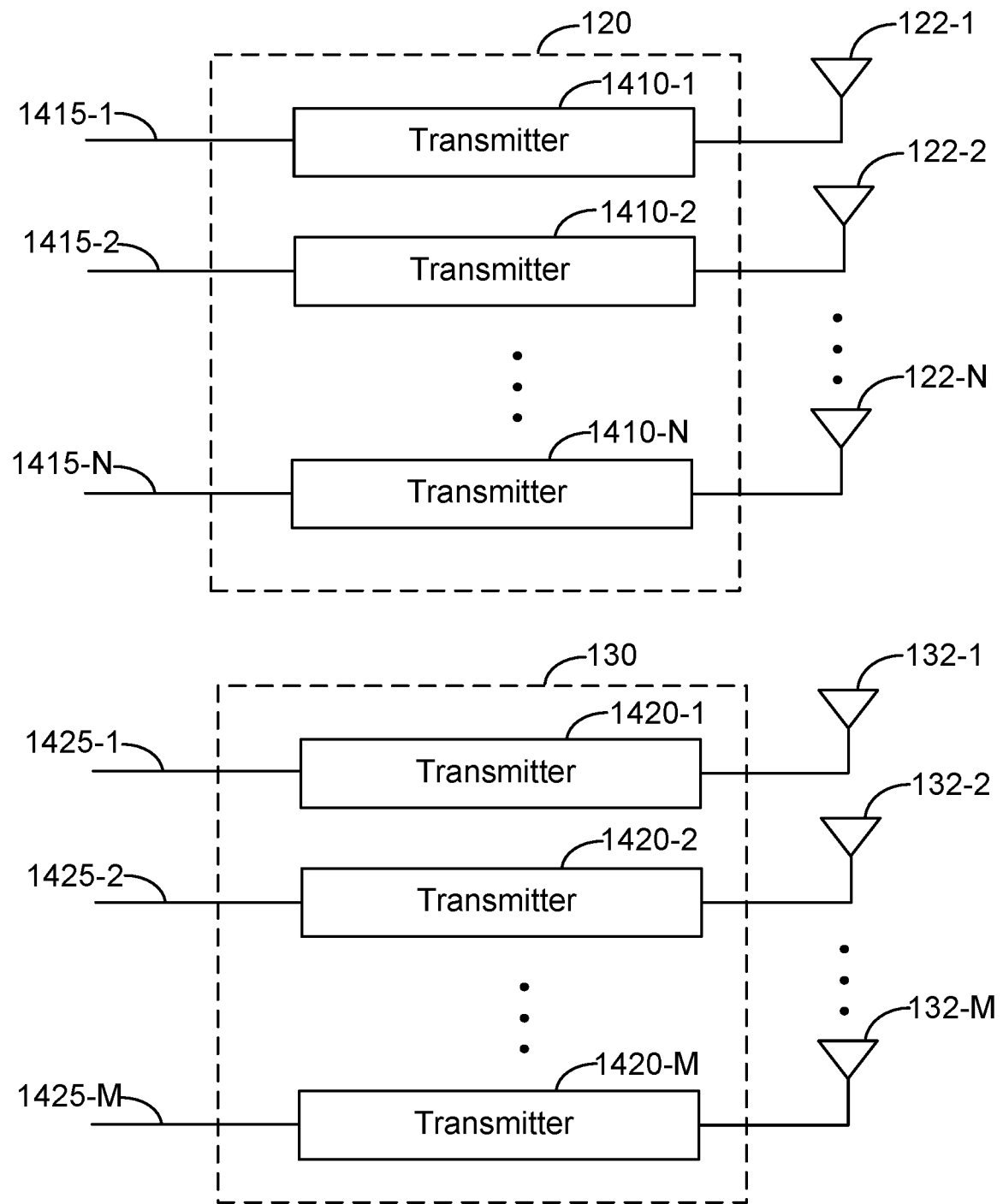
FIG. 14 shows an example of a wireless device including multiple transmitters according to certain aspects of the present disclosure.

In the discussion below, the wireless device 100 is assumed to simultaneously transmit signals using multiple transmitters, where each transmitter transmits at a respective transmission power level. In this regard, FIG. 14 shows an example in which the first transmitter 120 for the first wireless technology (e.g., LTE) includes multiple transmitters 1410-1 to 1410-N. In this example, each of the transmitters 1410-1 to 1410-N is coupled to a respective one of the antennas 122-1 to 122-N (persistently or selectively/temporarily), and is configured to transmit a respective signal 1415-1 to 1415-N at the respective transmission power level. The signals 1415-1 to 1415-N may be generated by the processor(s) 110 (shown in FIG. 1) and input to the transmitters 1410-1 to 1410-N via the first bus 140 (shown in FIG. 1). The processing performed by each of the transmitters 1410-1 to 1410-N may include frequency up-conversion, power amplification, etc. The processor(s) 110 may individually set the transmission power levels of the transmitters 1410-1 to 1410-N. For example, each transmitter 1410-1 to 1410-N may include a respective power amplifier (PA), and the processor(s) 110 may set the transmission power level of each transmitter 1410-1 to 1410-N by setting the gain of the respective PA accordingly.

FIG. 14 also shows an example in which the second transmitter 130 for the second wireless technology (e.g., 5G) includes multiple transmitters 1420-1 to 1420-M. In this example, each of the transmitters 1420-1 to 1420-M is coupled to a respective one of the antennas 132-1 to 132-M (persistently or selectively/temporarily), and is configured to transmit a respective signal 1425-1 to 1425-M at the respective transmission power level. The signals 1425-1 to 1425-M may be generated by the processor(s) 110 (shown in FIG. 1) and input to the transmitters 1420-1 to 1420-M via the second bus 150 (shown in FIG. 1). The processing performed by each of the transmitters 1420-1 to 1420-M may include frequency up-conversion, power amplification, etc. The processor(s) 110 may individually set the transmission power levels of the transmitters 1420-1 to 1420-M. For example, each transmitter 1420-1 to 1420-M may include a respective power amplifier (PA), and the processor(s) 110 may set the transmission power level of each transmitter 1420-1 to 1420-M by setting the gain of the respective PA accordingly.

It is to be appreciated that the present disclosure is not limited to the example shown in FIG. 14. For example, two transmitters may be coupled to the same antenna in which the two transmitters are configured to transmit in different frequency bands. As another example, while the transmitters 120, 130 are described above as being configured for first and second wireless technologies, the transmitters 120, 130 may be configured for the same wireless technology. Therefore, it is to be appreciated that the exemplary methods discussed below are not limited to the example shown in FIG. 14.

At a given time, all of the transmitters 1410-1 to 1410-N and 1420-1 to 1420-M or a subset of the transmitters 1410-1 to 1410-N and 1420-1 to 1420-M may be active (e.g., depending on the transmit scenario). For the case where a subset of the transmitters 1410-1 to 1410-N and 1420-1 to 1420-M are active, the other ones of the transmitters 1410-1 to 1410-N and 1420-1 to 1420-M are inactive (i.e., not transmitting). In the discussion below, RF exposure compliance for a future time slot is assessed based on the active transmitters. As discussed above, in some scenarios it may be assumed that one or all other transmitters are active and transmitting at full power when determining how to operate a specific transmitter or transmitters.

To assess RF exposure compliance for a future time slot with simultaneous transmissions using multiple active transmitters, the processor 110 may determine a combined RF exposure distribution for the future time slot. The processor 110 may determine the combined RF exposure distribution for the future time slot by scaling the RF exposure distribution for each active transmitter based on the respective transmission power level, and combining the scaled RF exposure distributions for the active transmitters to obtain the combined RF exposure distribution. For the case where SAR exposure is assessed, the combined RF exposure distribution is a combined SAR distribution (e.g., determined based on equation (2), equation (3a), or equation (3b)). For the case where PD exposure is assessed, the combined RF exposure distribution is a combined PD distribution (e.g., determined based on equation (5), equation (6a), or equation (6b)). For the case where combined SAR and PD exposure is assessed, the combined RF exposure distribution is a combined SAR and PD distribution (e.g., determined based on equation (8)). As discussed above, SAR exposure may be assessed when the first transmitter 120 is active and the second transmitter 130 is inactive, PD exposure may be assessed when the second transmitter 130 is active and the first transmitter 120 is inactive, and combined SAR and PD exposure may be assessed when the first transmitter 120 and the second transmitter 130 are both active. In the discussion below, an RF exposure value may be a SAR value, a PD value, or a combined SAR and PD value.

After determining the combined RF exposure distribution for the future time slot, the processor 110 may determine whether the transmission power levels for the active transmitter meet RF exposure compliance. In one example, the processor 110 may determine whether compliance is met by comparing the RF exposure value at a peak location in the combined RF exposure distribution with an RF exposure limit. If the RF exposure value at the peak location is equal to or below the RF exposure limit, then the processor 110 may determine RF exposure compliance for the future time slot. If the RF exposure value at the peak location exceeds the RF exposure limit, then the processor 110 may determine non-compliance for the future time slot.

To assess time-average RF exposure compliance for the future time slot, the processor 110 may average the combined RF exposure distribution discussed above with combined RF exposure distributions for previous time slots to obtain a time-averaged combined RF exposure distribution (e.g., based on equation (9a), equation (9b), equation (10a), equation (10b) or equation (11)). The processor 110 then compares the RF exposure value at the peak location in the time-averaged combined RF exposure distribution with an RF exposure limit to assess time-average RF exposure compliance for the future time slot. If the RF exposure value at the peak location is equal to or below the RF exposure limit, then the processor 110 may determine time-average RF exposure compliance for the future time slot. If the RF exposure value at the peak location exceeds the RF exposure limit, then the processor 110 may determine non-compliance for the future time slot.

For the example in which RF exposure compliance is assessed only within the future time slot, the peak location discussed above may simply correspond to the location of the peak RF exposure value in the combined RF exposure distribution. For the example in which time-average RF exposure compliance is assessed, the peak location discussed above may correspond to the location of the peak RF exposure value in the time-averaged combined RF exposure distribution. Note that the location of the peak RF exposure value in the time-averaged combined RF exposure distribution is not necessarily the same as the location of the peak RF exposure value in the combined RF exposure distribution for the future time slot since the time-averaged combined RF exposure distribution is an average of the future time slot and previous time slots, as discussed above. As further discussed above, a device and/or processor may not explicitly calculate a combined and/or normalized distribution. In some such examples, determinations with respect to the future time slot or time-average RF exposure compliance may be made based on a combined and/or normalized distribution calculated by another device or processor or in accordance with requirements that would be necessitated by a combined and/or normalized distribution. In some aspects, the peak location is not expressly calculated. In some such examples, it may be assumed that there is complete overlap between transmitters and/or that all locations may correspond to the peak.

In the discussion below, RF exposure compliance may refer to RF exposure compliance only within the future time slot or time-average RF exposure compliance.

When the transmission power levels for the future time slot do not meet RF exposure compliance, the processor 110 may reduce the transmission power levels to meet RF exposure compliance. In one approach, the processor 110 may incrementally reduce the transmission power level for each active transmitter by a fixed step (e.g., 0.5 dB) until RF exposure compliance is met. However, in some cases, one of the active transmitters may contribute significantly more to the RF exposure value at the peak location than the other active transmitters. In these cases, reducing the transmission power levels for the active transmitters by the same amount penalizes active transmitters that may contribute little to the RF exposure value at the peak location.

To address this, aspects of the present disclosure determine the contribution of each active transmitter to the RF exposure value at the peak location or at another selected location, and reduce the transmission power levels for the active transmitters based on their contributions to the RF exposure value at the location to meet RF exposure compliance. In certain aspects, the transmission power level for each active transmitter is reduced in proportion to its contribution to the RF exposure value at the location.

Figure 15:
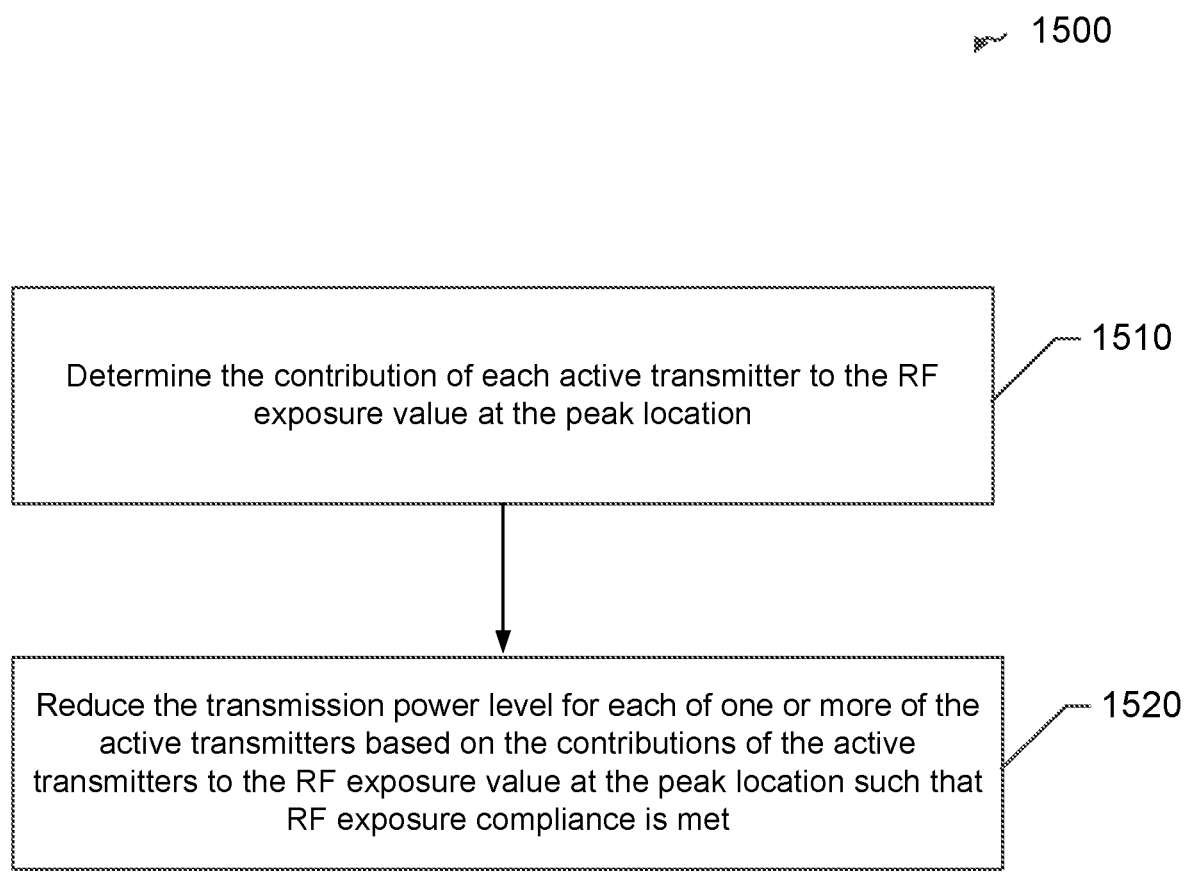
FIG. 15 is a flowchart illustrating an exemplary method for reducing transmission power levels to meet RF exposure compliance according to certain aspects of the present disclosure.

FIG. 15 illustrates a method 1500 for reducing transmission power levels to meet RF exposure compliance according to certain aspects of the present disclosure. The method 1500 may be performed by the processor(s) 110. The initial transmission power levels for the active transmitters (i.e., the transmission power levels for the active transmitters at the start of method 1500) may be determined based on one or more power control loops, one or more desired data rates, one or more desired beam directions or sectors, etc., as discussed above.

At block 1510, the processor(s) 110 determines the contribution of each active transmitter to the RF exposure value at a first peak location in the combined RF exposure distribution for the future time slot. The first location may be the peak location or another location. For example, the other location may be a location that is nearest a user. Compliance is ensured at the peak location, but contributions at the other location may be used to determine the reductions described below. In the following descriptions, the peak location will be recited for ease of description, but it will be understood that one or more other locations may be used. In one example, the processor 110 determines the contribution of each active transmitter based on the RF exposure value at the peak location in the scaled RF exposure distribution for the active transmitter and the RF exposure value at the peak location in the combined RF exposure distribution. The RF exposure distribution for each active transmitter is scaled based on the transmission power level for the active transmitter, as discussed above. The contribution of each active transmitter may be expressed as a ratio or a percentage of the transmitter's contribution to the RF exposure value at the peak location in the combined RF exposure distribution. For the example in which the contribution of each active transmitter is expressed as a ratio, the sum of the contributions of all of the active transmitters equals one. For the example in which the contribution of each active transmitter is expressed as a percentage, the sum of the contributions of all of the active transmitters equals 100 percent. For the example in which combined SAR and PD exposure is assessed, the RF exposure distributions for the active transmitters may be normalized before combining, as discussed above.

At block 1520, the processor(s) 110 reduces the transmission power level for each of one or more of the active transmitters based on the contributions of the active transmitters to the RF exposure value at the peak location in the combined RF exposure distribution such that RF exposure compliance is met. For the example in which RF exposure compliance is assessed only within the future time slot, RF exposure compliance may be met when the RF exposure value at the peak location in the combined RF exposure distribution is equal to or below the RF exposure limit. For the example in which time-average RF exposure compliance is assessed, RF exposure compliance may be met when the RF exposure value at the peak location in the time-averaged combined RF exposure distribution is equal to or less than the RF exposure limit. As discussed above, the RF exposure value at the peak location in the time-averaged combined RF exposure distribution is a function of the transmission power levels in the future time slot since the average includes the future time slot.

In certain aspects, the processor(s) 110 may reduce the transmission power level for each active transmitter in proportion to its contribution to the RF exposure value at the peak location in the combined RF exposure distribution. Accordingly, in these aspects, the transmission power level for the active transmitter that contributes the most to the RF exposure value at the peak location is reduced by the largest amount, the transmission power level for the active transmitter that contributes the second most to the RF exposure value at the peak location is reduced by the second largest amount, and so forth.

In certain aspects, one or more factors other than contribution may be used by the processor(s) 110 instead of or in addition to the contribution to determine a reduction in transmission power level for one or more transmitters. For example, as described in further detail below, a priority of transmitters may be used. In some aspects, it may be assumed that certain transmitters are transmitting at full power (or at another determined power) when determining how to reduce power for one or more other transmitters. In such examples, the transmit power of the certain transmitters (which are associated with the assumed transmit power) may not be adjusted, but the transmit power of the one or more other transmitters may be adjusted in accordance with the operations described below. In some such examples, the processor(s) 110 may consider there to be a complete overlap between a transmission area of the certain transmitters and all of the one or more transmitters such that the peak location (or selected location) may be determined with reference to the one or more other transmitters (e.g., independent of the certain transmitters).

Figure 16:
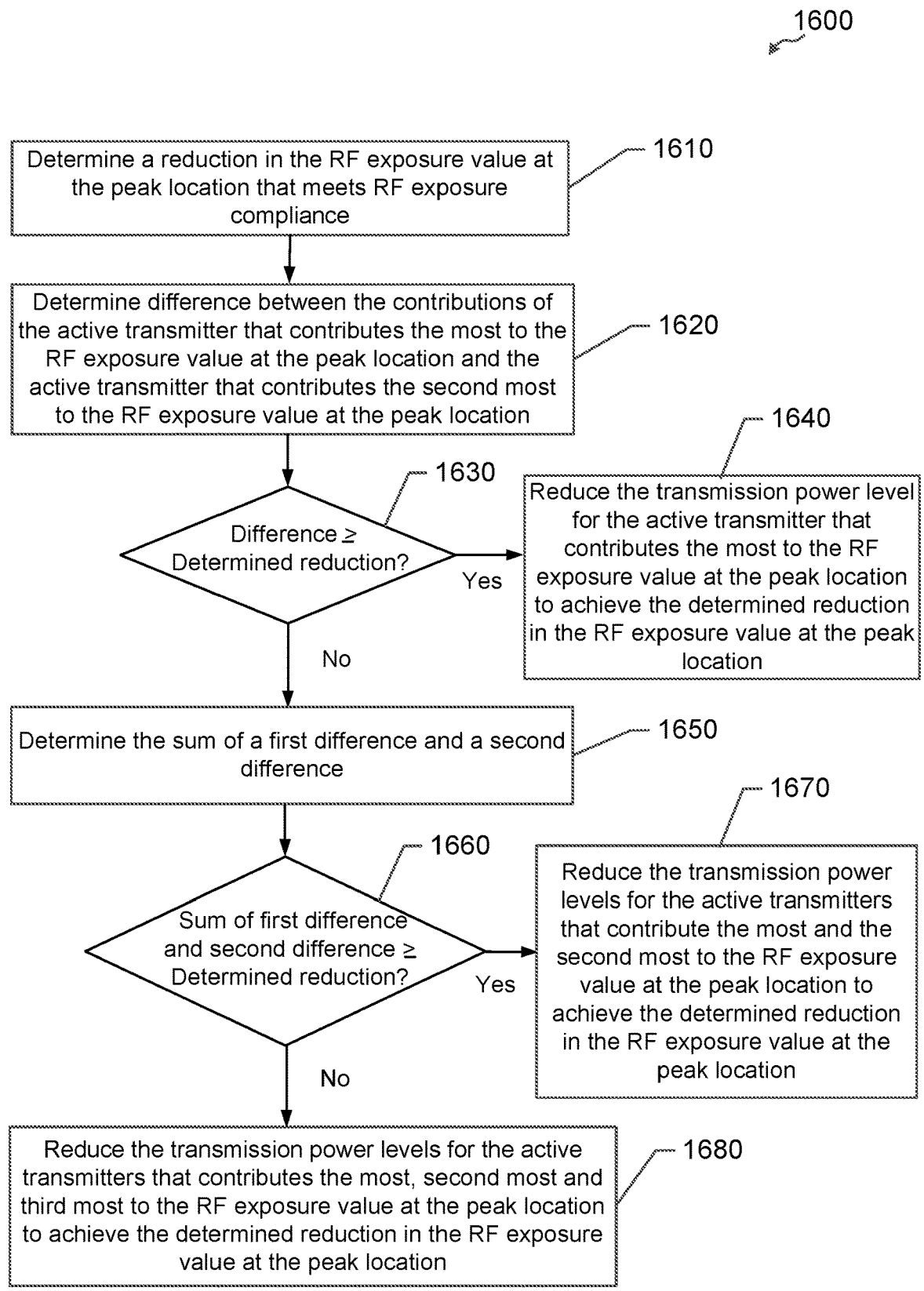
FIG. 16 is a flowchart illustrating an exemplary method for reducing transmission power levels based on contributions to an RF exposure value at a peak location according to certain aspects of the present disclosure.

FIG. 16 illustrates an exemplary method 1600 for reducing the transmission power levels in block 1520 according to certain aspects of the present disclosure. For ease of discussion, the exemplary method 1600 is discussed below using the example of three active transmitters labeled a, b and c, in which transmitter a contributes the most to the RF exposure value at the peak location, transmitter b contributes the second most to the RF exposure value at the peak location, and transmitter c contributes the least to the RF exposure value at the peak location. However, it is to be appreciated that method 1600 is not limited to this example.

At block 1610, the processor 110 determines a reduction in the RF exposure value at the peak location in the combined RF exposure distribution for the future time slot that meets RF exposure compliance. The reduction may be expressed as a percent reduction. For example, a 50% reduction indicates that a 50% reduction in the RF exposure value at the peak location meets RF exposure compliance. For the example where time-average RF exposure compliance is assessed, RF exposure compliance may be met when the reduction in the RF exposure value at the peak location in the combined RF exposure distribution results in the RF exposure value at the peak location in the time-averaged combined RF exposure distribution being equal to or below the RF exposure limit. For the example where RF exposure compliance is assessed only within the future time slot, RF exposure compliance may be met when the RF exposure value at the peak location in the combined SAR distribution is equal to or below the RF exposure limit.

At block 1620, the processor 110 determines the difference between the contributions of the active transmitter that contributes the most to the RF exposure value at the peak location (e.g., transmitter a) and the active transmitter that contributes the second most to the RF exposure value at the peak location (e.g., transmitter b). For example, if the contribution percentages for transmitters a, b and c are 60:25:15, respectively, then the difference between the contributions of the active transmitter that contributes the most to the RF exposure value at the peak location (e.g., transmitter a) and the active transmitter that contributes the second most to the RF exposure value at the peak location (e.g., transmitter b) is 35% (i.e., 60%−25%).

At block 1630, the processor 110 determines whether the difference in block 1620 is greater than or equal to the determined reduction in the RF exposure value at the peak location (i.e., the reduction determined in block 1610). If the difference is greater than or equal to the determined reduction, then the processor 110 proceeds to block 1640. If the difference is less than the determined reduction, then the processor 110 proceeds to block 1650.

At block 1640, the processor 110 reduces the transmission power level for the active transmitter that contributes the most to the RF exposure value at the peak location (e.g., transmitter a) to achieve the determined reduction in the RF exposure value at the peak location to meet RF exposure compliance. The processor 110 leaves the transmission power levels for the other active transmitters (e.g., transmitters b and c) alone in this case. For example, if the contribution percentages for transmitters a, b and c are 60:25:15, respectively, and the determined reduction is 25%, then the difference in block 1620 is 35% (i.e., 60%−25%), which is greater than the determined reduction of 25%. In this case, the processor 110 reduces the transmission power level for transmitter a to achieve the determined reduction in the RF exposure value at the peak location.

At block 1650, the processor 110 determines the sum of a first difference and a second difference, in which the first difference is between the contributions of the active transmitter that contributes the most to the RF exposure value at the peak location (i.e., transmitter a) and the active transmitter that contributes the third most to the RF exposure value at the peak location (e.g., transmitter c), and the second difference is between the contributions of the active transmitter that contributes the second most to the RF exposure value at the peak location (e.g., transmitter b) and the active transmitter that contributes the third most to the RF exposure value at the peak location (e.g., transmitter c). For example, if the contribution percentages for transmitters a, b and c are 60:25:15, respectively, then the sum of the first difference and the second difference is 55% (i.e., (60%−15%)+(25%−15%)).

At block 1660, the processor 110 determines whether the sum of the first difference and the second difference in block 1650 is greater than or equal to the determined reduction in the RF exposure value at the peak location (i.e., the reduction determined in block 1610). If the sum of the first difference and the second difference is greater than or equal to the determined reduction, then the processor 110 proceeds to block 1670. If the sum of the first difference and the second difference is less than the determined reduction, then the processor 110 proceeds to block 1680.

At block 1670, the processor 110 reduces the transmission power levels for the active transmitters that contribute the most and the second most to the RF exposure value at the peak location (e.g., transmitters a and b) to achieve the determined reduction in the RF exposure value at the peak location. The processor 110 leaves the transmission power level for the active transmitter that contributes the third most to the RF exposure value at the peak location (e.g., transmitter c) alone in this case. For example, the processor 110 may reduce the transmission power levels for transmitters a and b such that the contributions of transmitters a and b to the RF exposure value at the peak location are approximately equal after the reduction. In this example, the transmission power level for transmitter a is reduced by a larger amount than the transmission power level for transmitter b. This is because transmitter a contributes more than transmitter b before the reduction, and transmitters a and b contribute equally after the reduction. Thus, in this example, the transmission power levels of transmitters a and b are reduced based on their contributions to the RF exposure value at the peak location.

Block 1670 may be illustrated by the following example. If the contribution percentages for transmitters a, b and c are 60:25:15, respectively, and the determined reduction is 45%, then the sum of the first difference and the second difference is 55% (i.e., (60%−15%)+(25%−15%)), which is greater than the determined reduction of 45%. In this case, the processor 110 reduces the transmission power levels for transmitters a and b to achieve the determined reduction in the RF exposure value at the peak location.

At block 1680, the processor 110 reduces the transmission power levels for the active transmitters that contribute the most, the second most and the third most to the RF exposure value at the peak location (e.g., transmitters a, b and c) to achieve the determined reduction in the RF exposure value at the peak location. For example, the processor 110 may reduce the transmission power levels for transmitters a, b and c such that the contributions of transmitters a, b and c to the RF exposure value at the peak location are approximately equal after the reduction. In this case, the transmission power level for transmitter a is reduced by the largest amount, and the transmission power level for transmitter c is reduced by the smallest amount. This is because transmitter a contributes the most and transmitter c contributes the least before the reduction, and transmitters a, b and c contribute equally after the reduction. Thus, in this example, the transmission power levels for transmitters a, b and c are reduced based on their contributions to the RF exposure value at the peak location.

Block 1680 may be illustrated by the following example. If the contribution percentages for transmitters a, b and c are 60:25:15, respectively, and the determined reduction is 70%, then the sum of the first difference and the second difference is 55% (i.e., (60%−15%)+(25%−15%), which is less than the determined reduction of 70%. In this case, the processor 110 reduces the transmission power levels of transmitters a, b and c to achieve the determined reduction in the RF exposure value at the peak location. The processor 110 may reduce the transmission power levels for transmitters a, b and c such that the contributions of transmitters a, b and c to the RF exposure value at the peak location are approximately equal after the reduction.

If there are more than three transmitters, a block similar to block 1650 may be included between block 1660 and block 1680. In this situation, the new block may refer to three differences (the differences between the contributions of: the active transmitter that contributes the most to the RF exposure value at the peak location and the active transmitter that contributes the fourth most to the RF exposure value at the peak location, the active transmitter that contributes the second most to the RF exposure value at the peak location and the active transmitter that contributes the fourth most to the RF exposure value at the peak location, and the active transmitter that contributes the third most to the RF exposure value at the peak location and the active transmitter that contributes the fourth most to the RF exposure value at the peak location). It could be determined (at another new block) whether the sum of the three differences is greater than or equal to the determined reduction. If so, the transmission powers for the transmitters that contribute the most, second most, third most may be reduced. Further, block 1680 may adjusted to refer to the active transmitters that contribute the most, second most, third most, and fourth most. If there are additional transmitters beyond four, similar adjustments may be made to the method 1600.

The method 1600 of FIG. 16 illustrates certain calculations and sequences that may be used to effect reductions in transmission power levels. It is contemplated that a desired or expected outcome may be accomplished for the examples used in relation to the method 1600 using a variety of techniques for calculating and reducing transmission power levels. In some examples, a processor 110 in the system may determine the relative RF exposure contributions of the transmitters, where relative contributions may be expressed as percentages of the combined RF exposure.

In a first example, a solution is sought to obtain a reduction in the total RF exposure value at the peak location from a combined RF exposure by three transmitters (Tx1, Tx2, Tx3), where the contributions of the three transmitters at the peak location may be expressed as {a=102, b=42.5, c=25.5}, respectively. The contributions of the three transmitters may contribute to a combined RF exposure of 170 at the peak location. When the compliance limit is 100, a SAR reduction by a value of 70 is required to meet the RF exposure limit.

A system configured in accordance with certain aspects of this disclosure can calculate a set of transmission power level reductions that provide an RF exposure distribution that meets the compliance limit. In the first example, the relative contributions to RF exposure by the three transmitters may be expressed as {60%, 25%, 15%}. A proportionate reduction in transmission power applied to each transmitter may be calculated based on the relative contributions of the transmitter to RF exposure. In the first example, the power reductions may be calculated to meet the SAR reduction of 70 (reduction_needed). Thus, the reductions per transmitter in the first example are: 0.6×70=42, 0.25×70=17.5, 0.15×70=10.5.

This mode of calculation may be referred to as equal priority reduction. For the example of {a=102, b=42.5, c=25.5}, the reductions are as follows.

The reduction for $Tx1=70*60\%=42$.

The reduction in dB for $Tx1=10*\log_{10}((102-42)/102)=-2.3$ dB.

The reduction for $Tx2=70*25\%=17.5$.

The reduction in dB for $Tx2=10*\log_{10}((42.5-17.5)/42.5)=-2.3$ dB.

The reduction for $Tx3=70*15\%=10.5$.

The reduction in dB for $Tx3=10*\log_{10}((25.5-10.5)/25.5)=-2.3$ dB.

As mentioned above and described further below, however, a priority of different transmitters and/or of reduction thereof may be considered when determining the backoffs.

The reductions may be described as backoff values, and may be calculated in proportion to respective contributions of the transmitters to the RF exposure at the peak location, as described above. As indicated in this example, the Tx contribution percentages at the peak location ($TxN_{contrib}$) are 60%:25%:15%. In some instances, the total backoff may be achieved from accumulated backoffs and/or past behavior for each transmitter ($TxN_{backoff}$). One such example of this approach may be expressed as:

WHILE max(Total_exposure)>100%

$TxN_{backoff}=TxN_{backoff}-\{$reduction_needed$\}*TxN_{contrib}$

Total_exposure=average past exposure+$Tx1_{backoff}$+$Tx2_{backoff}$+$Tx3_{backoff}$ Recompute max(Total_exposure), peak location and all $TxN_{contrib}$ at peak location

END WHILE.

In a second example also including the three transmitters and contributions of the first example, a processor 110 in the system may determine that combined RF exposure contributions of the two secondary transmitters (Tx2 and Tx3) amounts to a value of 68 (i.e., 42.5+25.5) indicating that the desired compliance level of RF exposure cannot be accomplished solely through reduction of transmission power levels of the secondary transmitters (Tx2 and Tx3). The processor 110 may be configured to reduce transmission power of the highest contributing transmitter until it reaches the contribution level of a next highest contributing transmitter. The transmission power levels of these transmitters may be reduced until the contribution level of a next highest contributing transmitter is reached. These reductions continue for the potentially increasing group of highest contributing transmitters until a solution is achieved. This approach to transmission power level reduction may be expressed as:

IF (a−b)>reduction_needed
   then reduce power for Tx1 only
   reduction for Tx1 transmitter=reduction_needed
Else IF (a−c)+(b−c)>reduction_needed
   then reduce power for Tx1 and Tx2 only
   The ratio of reductions are=(a−b)+y:y
   (a−b)+2y=reduction_needed
Else IF (a+b+c)>reduction_needed
   then reduce power for Tx1, Tx2 and Tx3
   The ratio of reductions are=(a−c)+x:(b−c)+x:x
   (a−b)+(b−c)*2+3x=reduction_needed
[additional steps may be performed if there are more than three transmitters]
END.

For the example of {a=102, b=42.5, c=25.5}, the ratio of reductions for the two highest contributing transmitters (Tx1, Tx2) are=(102−42.5)+y:y, where y=5.25.

The reduction for $Tx1=(a-b)+y=59.5\ 30\ 5.25=64.75$.

The reduction in dB for $Tx1=10*\log_{10}((102-64.75)/102)=-4.4$ dB.

The reduction for $Tx2=y=5.25$.

The reduction in dB for $Tx1=10*\log_{10}((42.5-5.25)/42.5)=-0.6$ dB.

Such operation may be an example of the method 1600 described above.

In a third example, a solution is sought to obtain a reduction in the total RF exposure value at the peak location from a combined RF exposure by three transmitters (Tx1, Tx2, Tx3), where the contributions of the three transmitters at the peak location may be expressed as {a=103.23, b=4.44, c=3.33}, respectively. The contributions of the three transmitters may contribute to a combined RF exposure of 111 at the peak location. When the compliance limit is 100, a SAR reduction by a value of 11 is required to meet the RF exposure limit. Here the relative contributions to RF exposure by the three transmitters may be expressed as {93%, 4%, 3%}. In this example, Tx1 is a first priority contributor and both Tx2 and Tx3 are second priority contributors. In the second example, elimination of the second priority contributions is insufficient to meet the desired SAR reduction. If the second priority contributions had been sufficient, the processor(s) 110 may determine to reduce the transmit power/contributions of only Tx2 and Tx3, or to reduce Tx2 and Tx2 in addition to Tx1 if a greater reduction is desired. But here, the reduction in RF exposure can be obtained by reducing transmission power to Tx1 alone. In this example, no reductions in transmission power to Tx2 and Tx3 are made, while transmission power to Tx1 may be reduced to obtain a reduction in contribution to RF exposure of >=11. For example, a 0.5 dB reduction in Tx1=103.23*10^ (−0.5/10)=92.0, a reduction of 11.23. Such operation may be an example of the method 1700 described below.

In a fourth example, a solution is sought to obtain a reduction in the total RF exposure value at the peak location from a combined RF exposure by three transmitters (Tx1, Tx2, Tx3), where the contributions of the three transmitters at the peak location may be expressed as {a=103.23, b=4.44, c=3.33], respectively. The contributions of three transmitters may contribute to a combined RF exposure of 111 at the peak location. When the compliance limit is 100, a SAR reduction by a value of 11 is required to meet the RF exposure limit. Here the relative contributions to RF exposure by the three transmitters may be expressed as {93%, 4%, 3%}. In this example, Tx1 is a first priority contributor and both Tx2 and Tx3 are second priority contributors, similar to the third example above. In this fourth example, however, priorities may be ignored. Reductions or backoffs may be made according to any of the examples or methods described herein without prioritizing any transmitter over another.

Thus, in some instances:

The reduction for $Tx1=11*93\%=10.23$.

The reduction in dB for $Tx1=10 \log_{10}((103.23-10.23)/103.23)=-0.45$ dB

The reduction for $Tx2=11*4\%=0.44$.

The reduction in dB for $Tx2=10*\log_{10}((4.44-0.44)/4.44)=-0.45$ dB.

The reduction for $Tx3=11*3\%=0.33$.

The reduction in dB for $Tx3=10*\log_{10}((3.33-0.33)/3.33)=-0.45$ dB.

As alluded to above, in certain aspects the active transmitters may be assigned priorities. For example, the active transmitters may be assigned priorities based on priorities of signals transmitted by the active transmitters. For instance, voice may be assigned a higher priority than data. Accordingly, a transmitter transmitting voice may be assigned a higher priority than a transmitter transmitting data. In one example, the memory 115 may include an arbitration list specifying priorities for different types of signals. In this example, the processor(s) 110 may assign a priority to each active transmitter based on the priority of the corresponding signal specified in the arbitration list. It is to be appreciated that two or more active transmitters may be assigned the same priority (e.g., when the two or more active transmitters transmit the same type of signal).

Figure 17:
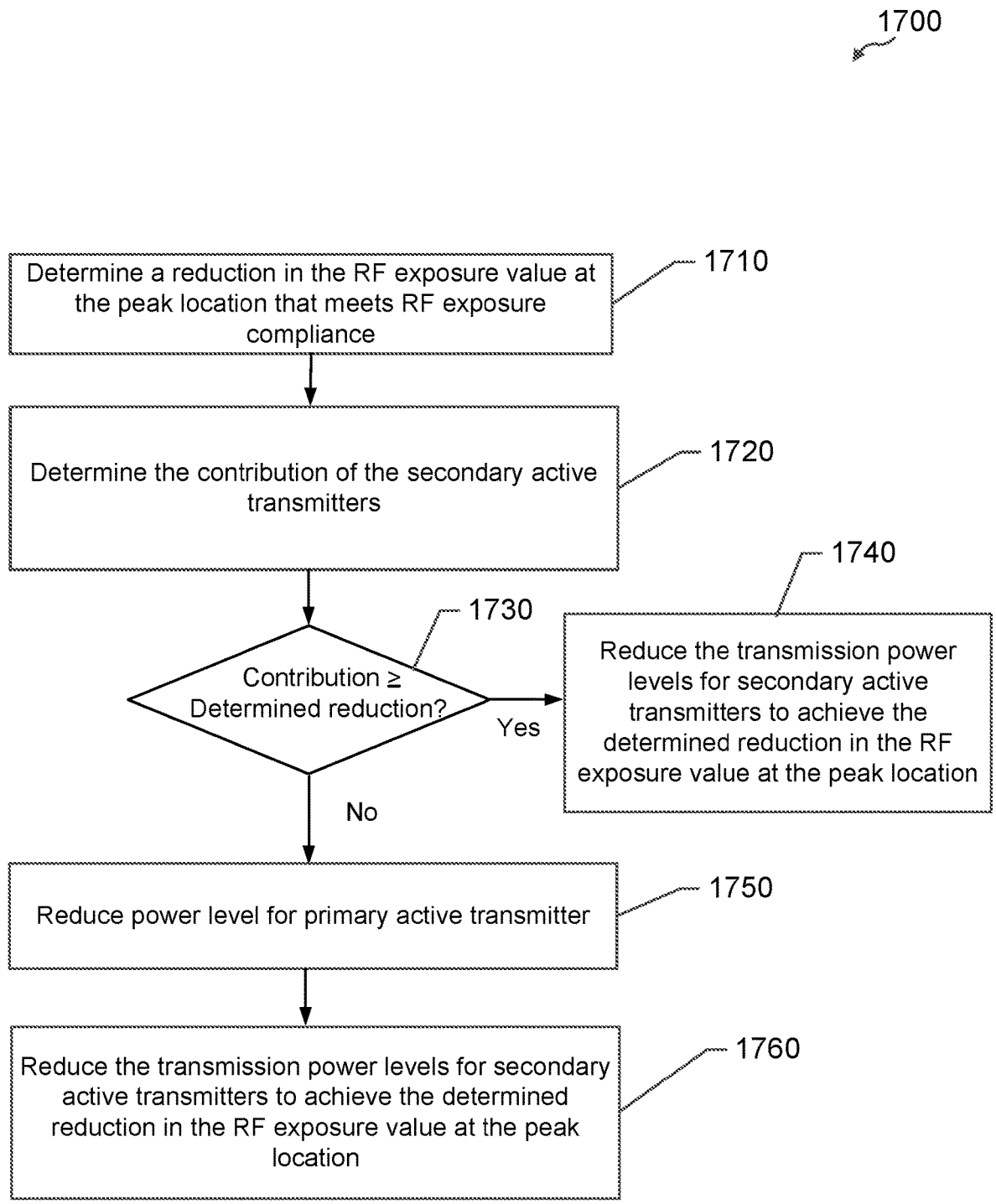
FIG. 17 is a flowchart illustrating an exemplary method for reducing transmission power levels based on priority according to certain aspects of the present disclosure.

In certain aspects, the processor(s) 110 takes into account the priorities of the active transmitters in block 1520 in addition to or instead of the contributions of the active transmitters to the RF exposure value at the peak location. In this regard, FIG. 17 illustrates an exemplary method 1700 for reducing the transmission power levels in block 1520 according to certain aspects of the present disclosure. For ease of discussion, the exemplary method 1700 is discussed below using the example of three active transmitters labeled a, b and c, in which transmitter a is assigned a primary priority and transmitters b and c are assigned a secondary priority that is lower than the primary priority. However, it is to be appreciated that method 1700 is not limited to this example.

At block 1710, the processor(s) 110 determines a reduction in the RF exposure value at the peak location in the combined RF exposure distribution for the future time slot that meets RF exposure compliance. The processor(s) 110 may determine the reduction in a similar manner as discussed above for block 1610.

At block 1720, the processor(s) 110 determines the contribution of the secondary active transmitters to the RF exposure value at the peak location. The secondary active transmitters are the active transmitter assigned the secondary (or lower) priority (i.e., transmitters b and c in above example). The processor(s) 110 may determine the contribution of the secondary active transmitters by summing the contribution of each secondary active transmitter. For the example in which transmitters b and c are the secondary active transmitters, the contribution of the secondary active transmitters is the sum of the contributions of active transmitters b and c. For example, if the contribution percentages for transmitters a, b and c are 90:6:4, respectively, then the contribution of the secondary active transmitters is 10% (i.e., 6%+4%). For the case where there is only one secondary active transmitter, the contribution is simply the contribution of the secondary active transmitter.

At block 1730, the processor(s) 110 determines whether the contribution of the secondary active transmitters in block 1720 is greater than or equal to the determined reduction in the RF exposure value at the peak location (i.e., reduction determine in block 1710). If the contribution is greater than or equal to the determined reduction, then the processor(s) 110 proceeds to block 1740. If the contribution is less than the determined reduction, then the processor(s) 110 proceeds to block 1750.

At block 1740, the processor(s) 110 reduces the transmission power levels for the secondary active transmitters to achieve the determined reduction in the RF exposure value at the peak location to meet RF exposure compliance. The processor(s) 110 may leave the transmission power level of the primary active transmitter (e.g., transmitter a) alone in this case. For example, if the contribution percentages for secondary transmitters b and c are 6:4, respectively, and the determined reduction is 5%, then the contribution of the secondary active transmitters 10%, which is greater than the determined reduction of 5%. In this case, the processor(s) 110 may reduce the transmission power levels for transmitters b and c to achieve the determined reduction in the RF exposure value at the peak location. The processor(s) 110 may reduce the transmission power levels for the secondary active transmitters using exemplary method 1600.

At block 1750, the processor(s) 110 reduces the transmission power level for the primary active transmitter. This is because the contribution of the secondary active transmitters is not sufficient to achieve the determined reduction in the RF exposure value at the peak location. For example, the processor(s) 110 may reduce the transmission power level for the primary active transmitter such that the remaining reduction in the RF exposure value at the peak location needed to achieve the determined reduction in the RF exposure value at the peak location is less than the contribution of the secondary active transmitters. This way, the remaining reduction in the RF exposure value at the peak location needed to meet RF exposure compliance can be achieved by reducing the transmission power levels for the secondary active transmitters.

Block 1750 may be illustrated by the following example. If the contribution percentages for transmitters a, b and c are 90:6:4, respectively, and the determined reduction to meet RF exposure compliance is 11%, then the contribution of the secondary active transmitters (i.e., 10%) is not sufficient to achieve the determined reduction of 11%. In this example, the processor 110 may reduce the transmission power level for the primary transmitter (i.e., transmitter a) by a minimum reduction (e.g., 0.5 dB), which results in a reduction of 9%. The remaining 2% reduction to needed reach 11% can be achieved by reducing the transmission power levels for the secondary active transmitters. The minimum reduction may correspond to the smallest step in dB that the processor 110 can reduce the transmission power level for the primary active transmitter.

At block 1760, the processor 110 reduces the transmission power level for the secondary active transmitter to further reduce the RF exposure value at the peak location to achieve the determined reduction in the RF exposure value at the peak location. The processor 110 may reduce the transmission power levels for the secondary active transmitters using exemplary method 1600.

In certain aspects, methods for reducing the transmission power levels in block 1520, including the method 1700 illustrated in FIG. 17, may be operable to modify or optimize power reduction calculations that may otherwise result in total or near-total deprivation of power to lower priority transmitters.

In some instances, the processor(s) 110 may be configured to ensure or guarantee at least some transmit power for secondary transmitters when power reductions are applied based on RF exposure values. In one example, a minimum level of power for each transmitter may be configured or defined and the processor 110 may calculate power reductions that maintain these preconfigured or predefined minimum values for each secondary transmitter. For example, the processor(s) 110 may use the contributions of the secondary transmitters that correspond to the preconfigured or predefined minimum values for the secondary transmitters.

In other instances, the processor(s) 110 may be configured to reduce transmit power for secondary transmitters to zero before reducing the highest priority transmitter when power reductions are applied based on RF exposure values. In some examples, reductions in transmit power for one or more secondary transmitters may result in transmission power levels that are insufficient to permit the secondary transmitters to operate effectively. In these examples, the below-minimum transmit power that would be provided to one or more secondary transmitters may be allocated to the higher-priority primary transmitter and/or among other secondary transmitters.

In some instances, the processor(s) 110 may be configured to use variable step sizes to reduce power to one or more transmitters when power reductions are applied based on RF exposure values. In one example, the processor(s) 110 may be configured to use a minimum and/or fixed step size in all calculations. In another example, the processor(s) 110 may be configured to use the minimum and/or fixed step size in calculations until transmit power for one or more secondary transmitters approaches a preconfigured or predefined minimum value or crosses a threshold defined or configured for the transmitters. The processor(s) 110 may be configured to use a minimum and/or fixed step size in calculations for certain transmitters and to use variable step sizes for other transmitters including, for example, for secondary transmitters that are approaching a preconfigured or predefined minimum value.

In certain aspects, the combined RF exposure distribution or time-averaged combined RF exposure distribution may include two or more hotspot regions. Each hotspot region may include a respective peak RF exposure value exceeding the RF exposure limit, and may correspond to a respective antenna. In these aspects, the processor(s) 110 may perform the method 1500 discussed above for each hotspot region, in which the peak location for each hotspot region corresponds to the location of the respective peak RF exposure value. After the processor(s) 110 performs the method 1500 for one of the hotspot regions, the processor(s) 110 may use the determined transmission power levels as the initial transmission power levels for performing the method 1500 for a next one of the hotspot regions. This helps ensure that the final determined transmission power levels after the method 1500 has been performed for all of the hotspot regions meet RF exposure compliance for all of the hotspot regions. Similarly, the method 1500 may be performed multiple times for multiple selected locations of interest other than the peak location(s).

After determining the transmission power levels for the active transmitters for the future time slot, the processor(s) 110 may do one or more of the following. The processor(s) 110 may set a transmission power limit for one or more (e.g., each) active transmitter for the future time slot based on the corresponding determined transmission power level. For example, the processor(s) 110 may set the transmission power level for one or more (e.g., each) active transmitter for the future time slot to the corresponding determined transmission power level. In one example, during the future time slot, the transmission power level of each active transmitter is constrained by the corresponding transmission power limit (e.g., not permitted to exceed the transmission power level at any time during the future time slot). In another example, during the future time slot, the time-average transmission power level of each active transmitter over the future time slot is constrained by the corresponding transmission power limit. In this example, the transmission power level of an active transmitter is permitted to temporarily exceed the corresponding transmission power limit within the future time slot as long as the time-average of the transmission power level over the future time slot does not exceed the transmission power limit. In still another example, the processor 110 may set the transmission power level of each active transmitter for the future time slot to the corresponding determined transmission power level.

In certain aspects, the memory 115 may include a computer readable medium including instructions stored thereon that, when executed by the processor(s) 110, cause the processor(s) 110 to perform any of the methods described herein. The computer readable medium may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other tangible non-transitory storage medium, or any combination thereof.

In certain aspects, an apparatus may include means for performing the method 1500, 1600 or 1700. In one example, the apparatus may include means for determining a specific absorption rate (SAR) distribution for a first wireless communication technology, means for determining a power density (PD) distribution for a second wireless communication technology, and means for combining the SAR distribution and the PD distribution to generate a combined RF exposure distribution. The apparatus may also include means for determining at least one first maximum allowable power level and at least one second maximum allowable power level for a future time slot based on the combined RF exposure distribution, means for setting at least one transmission power limit for a first transmitter in the future time slot based on the at least one first maximum allowable power level, and means for setting at least one transmission power limit for a second transmitter in the future time slot based on the at least one second maximum allowable power level.

In another example, the apparatus may include transmitters, means for determining an RF exposure value at a peak location based on transmission power levels for the transmitters, means for determining a contribution of each one of the transmitters to the RF exposure value at the peak location, and means for reducing the transmission power level for each one of one or more of the transmitters based on the contributions of the transmitters to the RF exposure value at the peak location. The RF exposure value may be an SAR value, a PD value, or a combined SAR and PD value. The means for reducing the transmission power level for each one of the one or more of the transmitters may be configured to determine, for each transmitter, a proportion of the RF exposure value attributable to the each transmitter at the first location, and reduce the transmission power level for the each transmitter in accordance with the proportion of the RF exposure value that is attributable to the each transmitter, wherein the RF exposure value at the first location corresponds to a peak RF exposure value. The means for reducing the transmission power level for each one of the one or more of the transmitters may be configured to determine one of the transmitters that contributes a most to the RF exposure value at the peak location, and reduce the transmission power level for the one of the transmitters by a largest amount among the transmitters. The means for reducing the transmission power level for each one of the one or more of the transmitters may be configured to determine a reduction in the RF exposure value at the peak location to meet an RF exposure limit. Reducing the transmission power level for each one of the one or more of the transmitters may be based also on the determined reduction in the RF exposure value at the peak location. Each transmitter may be assigned a respective priority and the means for reducing the transmission power level for each one of the one or more of the transmitters may be configured to reduce one or more transmission power levels based on the priorities of the transmitters. The means for reducing the transmission power level for each one of the one or more of the transmitters may be configured to reduce the transmission power level for each one of the one or more of the transmitters such that two or more of the transmitters contribute approximately equally to the RF exposure value at the peak location after the reduction. The means for reducing the transmission power level for each one of the one or more of the transmitters may be configured to reduce the transmission power level for each one of the one or more of the transmitters such that all of the transmitters contribute approximately equally to the RF exposure value at the peak location after the reduction. The means for reducing the transmission power level for each one of the one or more of the transmitters may be configured to set a transmission power limit for each transmitter based on the transmission power level for the transmitter. The means for determining the RF exposure value at the peak location may be configured to for each transmitter, scale a respective RF exposure distribution based the transmission power level for the transmitter, combine the scaled RF exposure distributions to obtain a combined RF exposure distribution, and determine the RF exposure value at the peak location in the combined RF exposure distribution.

Some implementation examples are described in the following numbered clauses:

1. A wireless device, comprising transmitters; and a processor coupled to the transmitters, wherein the processor is configured to: determine an RF exposure value at a first location based on transmission power levels for the transmitters; determine a contribution of each one of the transmitters to the RF exposure value at the first location; and reduce the transmission power level for each one of one or more of the transmitters based on the contributions of the transmitters to the RF exposure value at the first location.
2. The wireless device as described in clause 1, wherein the RF exposure value is an SAR value, a PD value, or a combined SAR and PD value.
3. The wireless device as described in clause 1 or clause 2, wherein the processor is configured to reduce the transmission power level for each one of the one or more of the transmitters by: determining, for each transmitter, a proportion of the RF exposure value attributable to the each transmitter at the first location; and reducing the transmission power level for the each transmitter in accordance with the proportion of the RF exposure value that is attributable to the each transmitter, wherein the RF exposure value at the first location corresponds to a peak RF exposure value.
4. The wireless device as described in clause 1 or clause 2, wherein the processor is configured to reduce the transmission power level for each one of the one or more of the transmitters by: determining one of the transmitters that contributes most to the RF exposure value at the first location when the RF exposure value at the first location corresponds to a peak RF exposure value; and reducing the transmission power level for the one of the transmitters by a largest amount among the transmitters.
5. The wireless device as described in clause 1 or clause 2, wherein: the processor is configured to determine a reduction in the RF exposure value at the first location to meet an RF exposure limit; and the processor is configured to reduce the transmission power level for each one of the one or more of the transmitters based also on the determined reduction in the RF exposure value at the first location.
6. The wireless device as described in clause 1 or clause 2, wherein each transmitter is assigned a respective priority; and the processor is configured to reduce the transmission power level for each one of the one or more of the transmitters based also on the priorities of the transmitters.

7. The wireless device as described in clause 1 or clause 2, wherein the processor is configured to reduce the transmission power level for each one of the one or more of the transmitters such that two or more of the transmitters contribute approximately equally to the RF exposure value at the first location after the reduction.

8. The wireless device as described in clause 7, wherein the processor is configured to reduce the transmission power level for each one of the one or more of the transmitters such that all of the transmitters contribute approximately equally to the RF exposure value at the first location after the reduction.

9. The wireless device as described in any of clauses 1-8, wherein, after the reduction, the processor is configured to set a transmission power limit for each transmitter based on the transmission power level for the transmitter.

10. The wireless device as described in any of clauses 1-9, wherein the processor is configured to determine the RF exposure value at the first location by: for each transmitter, scaling a respective RF exposure distribution based the transmission power level for the transmitter; combining the scaled RF exposure distributions to obtain a combined RF exposure distribution; and determining the RF exposure value at the first location in the combined RF exposure distribution, wherein the RF exposure value at the first location corresponds to a peak RF exposure value.

11. A method implemented in a wireless device including transmitters, comprising: determining an RF exposure value at a first location based on transmission power levels for the transmitters; determining a contribution of each one of the transmitters to the RF exposure value at the first location; and reducing the transmission power level for each one of one or more of the transmitters based on the contributions of the transmitters to the RF exposure value at the first location.

12. The method as described in clause 11, wherein the RF exposure value is an SAR value, a PD value, or a combined SAR and PD value.

13. The method as described in clause 11 or clause 12, wherein reducing the transmission power level for each one of the one or more of the transmitters comprises: determining, for each transmitter, a proportion of the RF exposure value attributable to the each transmitter at the first location; and reducing the transmission power level for the each transmitter in accordance with the proportion of the RF exposure value that is attributable to the each transmitter, wherein the RF exposure value at the first location corresponds to a peak RF exposure value.

14. The method as described in clause 11 or clause 12, wherein reducing the transmission power level for each one of the one or more of the transmitters comprises: determining one of the transmitters that contributes most to the RF exposure value at the first location when the RF exposure value at the first location corresponds to a peak RF exposure value; and reducing the transmission power level for the one of the transmitters by a largest amount among the transmitters.

15. The method as described in clause 11 or clause 12, further comprising: determining a reduction in the RF exposure value at the first location to meet an RF exposure limit, wherein reducing the transmission power level for each one of the one or more of the transmitters is based also on the determined reduction in the RF exposure value at the first location.

16. The method as described in clause 11 or clause 12, wherein: each transmitter is assigned a respective priority; and reducing the transmission power level for each one of the one or more of the transmitters is based also on the priorities of the transmitters.

17. The method as described in clause 11 or clause 12, wherein reducing the transmission power level for each one of the one or more of the transmitters comprises reducing the transmission power level for each one of the one or more of the transmitters such that two or more of the transmitters contribute approximately equally to the RF exposure value at the first location after the reduction.

18. The method as described in clause 17, wherein reducing the transmission power level for each one of the one or more of the transmitters comprises reducing the transmission power level for each one of the one or more of the transmitters such that all of the transmitters contribute approximately equally to the RF exposure value at the first location after the reduction.

19. The method as described in any of clauses 11-18, further comprising, after the reduction, setting a transmission power limit for each transmitter based on the transmission power level for the transmitter.

20. The method as described in any of clauses 11-19, wherein determining the RF exposure value at the first location comprises: for each transmitter, scaling a respective RF exposure distribution based the transmission power level for the transmitter; combining the scaled RF exposure distributions to obtain a combined RF exposure distribution; and determining the RF exposure value at the first location in the combined RF exposure distribution, wherein the RF exposure value at the first location corresponds to a peak RF exposure value.

21. An apparatus for wireless communication, comprising: transmitters; means for determining an RF exposure value at a first location based on transmission power levels for the transmitters; means for determining a contribution of each one of the transmitters to the RF exposure value at the first location; and means for reducing the transmission power level for each one of one or more of the transmitters based on the contributions of the transmitters to the RF exposure value at the first location.

22. The apparatus as described in clause 21, wherein the RF exposure value is an SAR value, a PD value, or a combined SAR and PD value.

23. The apparatus as described in clause 21, wherein the means for reducing the transmission power level for each one of the one or more of the transmitters is configured to: determine, for each transmitter, a proportion of the RF exposure value attributable to the each transmitter at the first location; and reduce the transmission power level for the each transmitter in accordance with the proportion of the RF exposure value that is attributable to the each transmitter, wherein the RF exposure value at the first location corresponds to a peak RF exposure value.

24. The apparatus as described in clause 21, wherein the means for reducing the transmission power level for each one of the one or more of the transmitters is configured to: one of the transmitters that contributes most to the RF exposure value at the first location when the RF exposure value at the first location corresponds to a peak RF exposure value; and reduce the transmission power level for the one of the transmitters by a largest amount among the transmitters.

25. The apparatus as described in clause 21, wherein the means for reducing the transmission power level for each one of the one or more of the transmitters is configured to: determine a reduction in the RF exposure value at the first location to meet an RF exposure limit, wherein reducing the transmission power level for each one of the one or more of the transmitters is based also on the determined reduction in the RF exposure value at the first location.

26. The apparatus as described in clause 21, wherein: each transmitter is assigned a respective priority; and the means for reducing the transmission power level for each one of the one or more of the transmitters is configured to reduce one or more transmission power levels based on the priorities of the transmitters.

27. The apparatus as described in clause 21, wherein the means for reducing the transmission power level for each one of the one or more of the transmitters is configured to reduce the transmission power level for each one of the one or more of the transmitters such that two or more of the transmitters contribute approximately equally to the RF exposure value at the first location after the reduction.

28. The apparatus as described in clause 27, wherein the means for reducing the transmission power level for each one of the one or more of the transmitters is configured to reduce the transmission power level for each one of the one or more of the transmitters such that all of the transmitters contribute approximately equally to the RF exposure value at the first location after the reduction.

29. The apparatus as described in clause 21, wherein the means for reducing the transmission power level for each one of the one or more of the transmitters is configured to set a transmission power limit for each transmitter based on the transmission power level for the transmitter.

30. The apparatus as described in clause 21, wherein the means for determining the RF exposure value at the first location is configured to: for each transmitter, scale a respective RF exposure distribution based the transmission power level for the transmitter; combine the scaled RF exposure distributions to obtain a combined RF exposure distribution; and determine the RF exposure value at the first location in the combined RF exposure distribution, wherein the RF exposure value at the first location corresponds to a peak RF exposure value.

It is to be appreciated that the present disclosure is not limited to the exemplary terms used above to describe aspects of the present disclosure, and that the present disclosure covers equivalent terms. For example, it is to be appreciated that a distribution may also be referred to as a map, a scan, or another term. In another example, it is to be appreciated that an antenna may also be referred to as an antenna element or another term. In yet another example it is to be appreciated that a maximum allowable power level may also be referred to as a power level limit or another term.

The term "approximately", as used herein with respect to a stated value or a property, is intended to indicate being within 10% of the stated value or property.

Any reference to an element herein using a designation such as "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A wireless device, comprising:
    transmitters; and
    a processor coupled to the transmitters, wherein the processor is configured to:
        determine a radio frequency (RF) exposure value at a first location based on transmission power levels for the transmitters;
        determine a contribution of each one of the transmitters to the RF exposure value at the first location;
        reduce a transmission power level for a first transmitter of the transmitters by a first percentage determined based on the contribution of the first transmitter to the RF exposure value at the first location; and
        reduce a transmission power level for a second transmitter of the transmitters by a second percentage determined based on the contribution of the second transmitter to the RF exposure value at the first location, wherein the first percentage is different from the second percentage.

2. The wireless device of claim 1, wherein the RF exposure value is a specific absorption rate (SAR) value, a power density (PD) value, or a combined SAR and PD value.

3. The wireless device of claim 1, wherein the contribution of the first transmitter to the RF exposure value at the first location is calculated as a percentage of the sum of the contributions of the first transmitter and the second transmitter to the RF exposure value at the first location, and wherein the RF exposure value at the first location corresponds to a peak RF exposure value.

4. The wireless device of claim 1, wherein the transmission power level for the first transmitter is reduced by greater amount than the transmission power level for the second transmitter when the contribution of the first transmitter to the RF exposure value at the first location is greater than the contribution of the second transmitter and when the RF exposure value at the first location corresponds to a peak RF exposure value.

5. The wireless device of claim 1, wherein:
    the processor is configured to determine a reduction in the RF exposure value at the first location to meet an RF exposure limit; and the processor is configured to reduce the transmission power level for the first transmitter and for the second transmitter based also on the determined reduction in the RF exposure value at the first location.

6. The wireless device of claim 1, wherein the first transmitter and the second transmitter are assigned respective priorities and wherein the processor is configured to:
reduce the transmission power level for each of the first transmitter and the second transmitter based also on the respective priorities.

7. The wireless device of claim 1, wherein the processor is configured to reduce the transmission power level for each one of the first transmitter and the second transmitter such that the first transmitter and the second transmitter contribute approximately equally to the RF exposure value at the first location after the reduction.

8. The wireless device of claim 7, wherein the processor is configured to reduce the transmission power level for each one of the transmitters such that all of the transmitters contribute approximately equally to the RF exposure value at the first location after the reduction.

9. The wireless device of claim 1, wherein, after the transmission power level for each transmitter of the transmitters is reduced, the processor is configured to set a transmission power limit for the each transmitter based on the transmission power level for the each transmitter.

10. The wireless device of claim 1, wherein the processor is configured to determine the RF exposure value at the first location by:
for each transmitter, scaling a respective RF exposure distribution based the transmission power level for the transmitter;
combining the scaled RF exposure distributions; and
determining the RF exposure value at the first location based on the combination of the scaled RF exposure distributions, wherein the RF exposure value at the first location corresponds to a peak RF exposure value.

11. A method implemented in a wireless device including transmitters, comprising:
determining a radio frequency (RF) exposure value at a first location based on transmission power levels for the transmitters;
determining a contribution of each one of the transmitters to the RF exposure value at the first location;
reducing a transmission power level for a first transmitter of the transmitters by a first percentage determined based on the contribution of the first transmitter to the RF exposure value at the first location; and
reducing a transmission power level for a second transmitter of the transmitters by a second percentage determined based on the contribution of the second transmitter to the RF exposure value at the first location, wherein the first percentage is different from the second percentage.

12. The method of claim 11, wherein the RF exposure value is a specific absorption rate (SAR) value, a power density (PD) value, or a combined SAR and PD value.

13. The method of claim 11, wherein the contribution of the first transmitter to the RF exposure value at the first location is calculated as a percentage of the sum of the contributions of the first transmitter and the second transmitter to the RF exposure value at the first location, and wherein the RF exposure value at the first location corresponds to a peak RF exposure value.

14. The method of claim 11, wherein the transmission power level for the first transmitter is reduced by greater amount than the transmission power level for the second transmitter when the contribution of the first transmitter to the RF exposure value at the first location is greater than the contribution of the second transmitter and when the RF exposure value at the first location corresponds to a peak RF exposure value.

15. The method of claim 11, further comprising:
determining a reduction in the RF exposure value at the first location to meet an RF exposure limit,
wherein reducing the transmission power level for the first transmitter and for the second transmitter is based also on the determined reduction in the RF exposure value at the first location.

16. The method of claim 11, wherein the first transmitter and the second transmitter are assigned respective priorities, and further comprising:
reducing the transmission power level for each of the first transmitter and the second transmitter based also on the respective priorities.

17. The method of claim 11, wherein reducing the transmission power level for the first transmitter and the second transmitter causes the first transmitter and the second transmitter to contribute approximately equally to the RF exposure value at the first location after the reduction.

18. The method of claim 17, wherein all of the transmitters contribute approximately equally to the RF exposure value at the first location after reducing the transmission power level for the first transmitter and the second transmitter.

19. The method of claim 11, further comprising, after the transmission power level for each transmitter of the transmitters is reduced, setting a transmission power limit for the each transmitter based on the transmission power level for the each transmitter.

20. The method of claim 11, wherein determining the RF exposure value at the first location comprises:
for each transmitter, scaling a respective RF exposure distribution based the transmission power level for the transmitter;
combining the scaled RF exposure distributions; and
determining the RF exposure value at the first location based on the combination of the scaled RF exposure distributions, wherein the RF exposure value at the first location corresponds to a peak RF exposure value.

21. An apparatus for wireless communication, comprising:
transmitters;
means for determining a radio frequency (RF) exposure value at a first location based on transmission power levels for the transmitters;
means for determining relative contributions of the transmitters to the RF exposure value at the first location;
means for reducing a transmission power level for a first transmitter of the transmitters by a first percentage determined based on the contribution of the first transmitter to the RF exposure value at the first location; and
means for reducing a transmission power level for a second transmitter of the transmitters by a second percentage determined based on the contribution of the second transmitter to the RF exposure value at the first location, wherein the first percentage is different from the second percentage.

22. The apparatus of claim 21, wherein the RF exposure value is a specific absorption rate (SAR) value, a power density (PD) value, or a combined SAR and PD value.

23. The apparatus of claim 21, wherein the contribution of the first transmitter to the RF exposure value at the first location is calculated as a percentage of the sum of the contributions of the first transmitter and the second transmitter to the RF exposure value at the first location, and wherein the RF exposure value at the first location corresponds to a peak RF exposure value.

24. The apparatus of claim 21, wherein the transmission power level for the first transmitter is reduced by greater amount than the transmission power level for the second transmitter when the contribution of the first transmitter to the RF exposure value at the first location is greater than the contribution of the second transmitter and when the RF exposure value at the first location corresponds to a peak RF exposure value.

25. The apparatus of claim 21, further comprising means for determining a reduction in the RF exposure value at the first location to meet an RF exposure limit,
wherein reducing the transmission power level for the first transmitter and for the second transmitter is based also on the determined reduction in the RF exposure value at the first location.

26. The apparatus of claim 21, wherein the first transmitter and the second transmitter are assigned respective priorities, and wherein the means for reducing the transmission power levels for the first transmitter and the second transmitter are configured to reduce the transmission power level for each of the first transmitter and the second transmitter based also on the respective priorities.

27. The apparatus of claim 21, wherein reducing the transmission power level for the first transmitter and the second transmitter causes the first transmitter and the second transmitter to contribute approximately equally to the RF exposure value at the first location after the reduction.

28. The apparatus of claim 27, wherein all of the transmitters contribute approximately equally to the RF exposure value at the first location after reducing the transmission power level for the first transmitter and the second transmitter.

29. The apparatus of claim 21, further comprising means for setting a transmission power limit for each transmitter based on the transmission power level for the transmitter.

30. The apparatus of claim 21, wherein the means for determining the RF exposure value at the first location is configured to:
for each transmitter, scale a respective RF exposure distribution based the transmission power level for the transmitter;
combine the scaled RF exposure distributions; and
determine the RF exposure value at the first location based on the combination of the scaled RF exposure distribution, wherein the RF exposure value at the first location corresponds to a peak RF exposure value.

* * * * *